United States Patent
Yang et al.

(10) Patent No.: US 11,974,297 B2
(45) Date of Patent: Apr. 30, 2024

(54) BEACON FRAME TRANSMISSION CONTROL METHOD AND RELATED APPARATUS

(71) Applicant: HUAWEI TECHNOLOGIES CO., LTD., Shenzhen (CN)

(72) Inventors: Mao Yang, Xi'an (CN); Zhongjiang Yan, Xi'an (CN); Guogang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 583 days.

(21) Appl. No.: 17/155,386

(22) Filed: Jan. 22, 2021

(65) Prior Publication Data

US 2021/0168795 A1    Jun. 3, 2021

Related U.S. Application Data

(63) Continuation of application No. PCT/CN2019/091752, filed on Jun. 18, 2019.

(30) Foreign Application Priority Data

Jul. 25, 2018 (CN) .......................... 201810829801.7

(51) Int. Cl.
  *H04W 72/04* (2023.01)
  *H04L 5/00* (2006.01)
  (Continued)

(52) U.S. Cl.
  CPC ........... *H04W 72/27* (2023.01); *H04L 5/0053* (2013.01); *H04L 5/0091* (2013.01); *H04W 72/0446* (2013.01)

(58) Field of Classification Search
  CPC . H04W 72/27; H04W 72/0446; H04W 48/12; H04W 84/12; H04L 5/0053;
  (Continued)

(56) References Cited

U.S. PATENT DOCUMENTS

| | | | |
|---|---|---|---|
| 2005/0128988 A1* | 6/2005 | Simpson | H04W 48/16 370/338 |
| 2008/0009307 A1* | 1/2008 | Sekhar | H04W 48/10 455/524 |

(Continued)

FOREIGN PATENT DOCUMENTS

| | | |
|---|---|---|
| CN | 103096492 A | 5/2013 |
| CN | 103796277 A | 5/2014 |

(Continued)

OTHER PUBLICATIONS

MediaTek, Clarification on WiFi Beacon Coexistence Support. 3GPP TSG-RAN WG2 Meeting #74, Barcelona, Spain, May 9, 2011, R2-113109, 2 pages.

*Primary Examiner* — Candal Elpenord
(74) *Attorney, Agent, or Firm* — Rimon PC

(57) ABSTRACT

A beacon frame transmission control method and a related apparatus are provided that improve the transmission robustness of the beacon frame. The method includes: generating, by a master access point AP, indication information used to indicate a transmission time period of a beacon frame of at least one secondary AP; and sending, by the master AP, the indication information to the at least one secondary AP, where the master AP and the at least one secondary AP belong to a same AP collaboration group, and transmission time periods of beacon frames of APs in the AP collaboration group are different.

9 Claims, 14 Drawing Sheets

(51) Int. Cl.
*H04W 72/0446* (2023.01)
*H04W 72/27* (2023.01)

(58) Field of Classification Search
CPC ... H04L 5/0091; H04L 5/0048; H04L 5/0094; H04L 5/0035
USPC .................................................. 370/329–330
See application file for complete search history.

(56) References Cited

U.S. PATENT DOCUMENTS

| | | |
|---|---|---|
| 2008/0205340 A1 | 8/2008 | Meylan et al. |
| 2014/0192785 A1* | 7/2014 | Gong .................. H04W 56/001 370/336 |
| 2015/0131628 A1 | 5/2015 | Chu et al. |
| 2015/0341853 A1* | 11/2015 | Cho .................... H04W 56/002 370/331 |
| 2016/0286477 A1* | 9/2016 | Lin ....................... H04B 17/318 |
| 2018/0270863 A1* | 9/2018 | Oteri ................. H04W 74/0816 |

FOREIGN PATENT DOCUMENTS

| | | |
|---|---|---|
| CN | 104768191 A | 7/2015 |
| CN | 104853375 A | 8/2015 |
| CN | 105165100 A | 12/2015 |
| CN | 105493583 A | 4/2016 |
| CN | 107211351 A | 9/2017 |

* cited by examiner

BEACON FRAME TRANSMISSION CONTROL METHOD AND RELATED APPARATUS

CROSS-REFERENCE TO RELATED APPLICATIONS

This application is a continuation of International Application No. PCT/CN2019/091752, filed on Jun. 18, 2019, which claims priority to Chinese Patent Application No. 201810829801.7, filed on Jul. 25, 2018. The disclosures of the aforementioned applications are hereby incorporated by reference in their entireties.

TECHNICAL FIELD

This application relates to the field of communications technologies, and in particular, to a beacon frame transmission control method and a related apparatus.

BACKGROUND

A beacon frame is a management frame that is in a basic service set (BSS) system and that carries functions such as resource planning, mechanism indication, and parameter configuration in a BSS. Each BSS may include an access point (AP), where the AP is configured to provide services such as data transmission for a station (STA) in the BSS.

During actual application, the AP may periodically send a beacon frame to the STA in the BSS, to notify the STA in the BSS of BSS-related management information.

Currently, to avoid a communications blind spot, in a relatively common network deployment manner, a plurality of APs are deployed within a range, for example, in a data transmission scenario such as a shopping mall or a school. However, when coverage of the plurality of APs is relatively close, beacons may interfere with each other; and consequently, transmission robustness of the beacon frame is reduced.

SUMMARY

This application provides a beacon frame transmission control method and a related apparatus, to improve transmission robustness of a beacon frame.

According to a first aspect, this application provides a beacon frame transmission control method. The method includes:
  generating, by a master AP, indication information used to indicate a transmission time period of a beacon frame of at least one secondary AP; and
  sending, by the master AP, the indication information to the at least one secondary AP, where
  the master AP and the at least one secondary AP belong to a same AP collaboration group, and transmission time periods of beacon frames of APs in the AP collaboration group are different.

According to the beacon frame transmission control method provided in this application, because the secondary AP in the AP collaboration group sends the beacon frame of the secondary AP only in a transmission time period allocated to the secondary AP, it can be ensured that there is no collision between the beacon frames of the APs in the AP collaboration group, thereby improving transmission robustness of the beacon frames.

In a possible implementation, a beacon frame of the master AP may be referred to as a first beacon frame, and a beacon frame of each secondary AP may be referred to as a second beacon frame. The master AP may indicate a transmission time period of the second beacon frame of each secondary AP by sending, in a beacon interval BI of the master AP, the first beacon frame that carries the indication information. The indication information may be used to indicate a transmission time period of at least one second beacon frame.

In a possible implementation, the indication information includes at least one time interval and identification information of the at least one secondary AP, where the time interval may also be referred to as a time offset, the at least one time interval included in the indication information is in a one-to-one correspondence with the at least one secondary AP, and the time interval is used to indicate a time difference between a transmission time point of a second beacon frame of a corresponding secondary AP and an end time point of the first beacon frame.

In a possible implementation, the master AP may divide the BI into N equal time periods, where N is a total quantity of APs including the master AP and the at least one secondary AP, that is, N minus 1 is equal to a quantity of secondary APs in the at least one secondary AP. A first equal time period in the N equal time periods is used as a transmission time period of the first beacon frame, and (N−1) equal time periods in the N equal time periods other than the first equal time period are used as the transmission time period of the at least one secondary AP, where the (N−1) equal time periods are in a one-to-one correspondence with (N−1) secondary APs.

In a possible implementation, the indication information includes a list of the at least one secondary AP, the list includes an identifier used to indicate the at least one secondary AP, and a location of the identifier of the at least one secondary AP in the list is in a one-to-one correspondence with the (N−1) equal time periods. After receiving the indication information, each secondary AP determines an equal time period corresponding to a location of an AP identifier of the secondary AP in the list as a transmission time period of a second beacon frame of the secondary AP. For example, the transmission time period of the second beacon frame corresponding to the secondary AP may be adjusted by adjusting the location of the identifier of the secondary AP in the list.

In a possible implementation, the indication information further includes a sum N of the quantity of secondary APs in the at least one secondary AP and a quantity of master APs.

In a possible implementation, the master AP may set a STA in a BSS corresponding to the master AP to prohibit data transmission in a transmission time period of a beacon frame of another AP. For example, this implementation may be implemented in a manner in which the master AP may send a silence period indication to the STA in the BSS of the master AP before the transmission time period of the second beacon frame of the at least one secondary AP arrives.

Based on the first aspect, in a transmission time period of a beacon frame of an AP in the AP collaboration group, the other AP in the AP collaboration group may prohibit data transmission in a BSS corresponding to the other AP, so that mutual interference between data transmitted in the AP collaboration group and the beacon frame is avoided, thereby improving transmission robustness of the beacon frame.

In a possible implementation, the master AP may be any AP in the AP collaboration group, an AP having a largest quantity of neighbor APs in the AP collaboration group, or an AP selected from the AP collaboration group in another manner.

In a possible implementation, before the master AP performs the step of generating the indication information, a convening AP may send a master AP selection request message to the master AP. After receiving the master AP selection request message, the master AP sends, to the convening AP, a response message that carries a quantity of neighbor APs of the master AP. The convening AP may further send a master AP selection request message to the other AP, and receive a response message sent by the other AP. Then, the convening AP may select, based on the obtained information, the AP having the largest quantity of neighbor APs as the master AP. A range in which the convening AP selects the master AP may be a preset range including at least two APs, and the at least two APs may include the convening AP and the master AP, or may further include the other AP. Then, the convening AP may send a master AP acknowledgment indication to the master AP, where the master AP acknowledgment indication may indicate identity acknowledgment of the master AP in the AP collaboration group. The other AP in the AP collaboration group may be determined based on some or all APs in the at least two APs.

According to a second aspect, this application further provides a beacon frame transmission control method. The method includes:
  receiving, by a target secondary AP, indication information that is sent by a master AP and that is used to indicate a transmission time period of a beacon frame of at least one secondary AP, where the target secondary AP belongs to the at least one secondary AP; and
  sending, by the target secondary AP, a beacon frame of the target secondary AP in the transmission time period, indicated by the indication information, of the beacon frame, where
  the master AP and the at least one secondary AP belong to a same AP collaboration group, and transmission time periods of beacon frames of APs in the AP collaboration group are different.

In a possible implementation, a beacon frame of the master AP may be referred to as a first beacon frame, and the beacon frame of the at least one secondary AP may be referred to as a second beacon frame. The target secondary AP may receive the first beacon frame that is sent by the master AP and that carries the indication information, where the indication information is used to indicate a transmission time period of at least one second beacon frame.

In a possible implementation, the indication information includes at least one time interval and identification information that is used to indicate the at least one secondary AP, where the at least one time interval is in a one-to-one correspondence with the at least one secondary AP, and the time interval is used to indicate a time difference between a transmission time point of a second beacon frame of a corresponding secondary AP and an end time point of the first beacon frame.

In a possible implementation, a BI includes N equal time periods, where N minus 1 is equal to a quantity of secondary APs in the at least one secondary AP; a transmission time period of the first beacon frame corresponds to a first equal time period in the N equal time periods; and (N−1) equal time periods in the N equal time periods other than the first equal time period are in a one-to-one correspondence with the at least one secondary AP.

In a possible implementation, the indication information includes a list of the at least one secondary AP, the list includes an identifier used to indicate the at least one secondary AP, and a location of the identifier of the at least one secondary AP in the list is in a one-to-one correspondence with the (N−1) equal time periods; and
  the transmission time period of the second beacon frame of the secondary AP is an equal time period corresponding to the location of the identifier of the secondary AP in the list.

In a possible implementation, the indication information further includes a sum N of the quantity of secondary APs in the at least one secondary AP and a quantity of master APs.

In a possible implementation, the method further includes:
  before a transmission time period of a beacon frame of another AP in the AP collaboration group arrives, sending, by the target secondary AP, a silence period indication to a station STA in a basic service set BSS of the target secondary AP, where the silence period indication is used to indicate the STA in the BSS corresponding to the target secondary AP to prohibit data transmission in the transmission time period of the beacon frame of the other AP in the AP collaboration group.

In a possible implementation, the master AP is an AP having a largest quantity of neighbor APs in the AP collaboration group.

In a possible implementation, before the master AP generates the indication information used to indicate the transmission time period of the beacon frame of the at least one secondary AP, the method further includes:
  sending, by the master AP to a convening AP, the quantity that is of the neighbor APs and that corresponds to the master AP; and
  receiving a master AP acknowledgment indication sent by the convening AP, where the master AP acknowledgment indication is sent by the convening AP to the AP having the largest quantity of neighbor APs, where
  the AP collaboration group is determined based on at least two APs.

According to a third aspect, this application provides a method for determining a master AP. The method includes:
  obtaining a quantity that is of neighbor APs and that corresponds to each of at least two APs; and
  determining an AP that is in the at least two APs and that corresponds to a largest quantity of neighbor APs as a master AP in an AP collaboration group corresponding to the at least two APs.

The method for determining a master AP provided in this embodiment of this application may be used to determine the master AP in the AP collaboration group. The method for determining a master AP provided in this embodiment of this application may be performed before the beacon frame transmission control method provided in the first aspect, or may be used in another scenario in which the method provided in the first aspect is not used.

In a possible implementation, a convening AP may obtain the quantity that is of the neighbor APs and that corresponds to each of the at least two APs. The convening AP may be either of the at least two APs. The convening AP may request, by sending a master AP selection request message to another AP in the at least two APs, the other AP to feed back information such as information used to determine a quantity of neighbor APs of the master AP. Then, the convening AP may determine the master AP in the AP collaboration group based on the received information. The finally determined master AP may be the convening AP, or may be another AP in the at least two APs than the convening AP.

In a possible implementation, after the master AP is determined, the master AP may send an AP group setup request message to the other AP in the at least two APs. The other AP may send a response message to the master AP, and the master AP receives the response message sent by the other AP. If the response message indicates that the other AP is willing to join the AP collaboration group corresponding to the master AP, the master AP determines the other AP as a secondary AP in the AP collaboration group.

According to a fourth aspect, an embodiment of this application provides a communications apparatus on a side of a master AP. The apparatus may be a master AP device, or may be a chip in the master AP. The apparatus can implement a function performed by the master AP in either of the first aspect or the third aspect. The function may be implemented by hardware, or may be implemented by hardware executing corresponding software. The hardware or software includes one or more units corresponding to the foregoing function.

In a possible implementation, when the apparatus is a master AP, the master AP includes a processor and a transceiver. The processor is configured to support the master AP in performing a corresponding function in the foregoing methods. The transceiver is configured to: support communication between the master AP and a secondary AP, a STA in a BSS corresponding to the master AP, or a first AP, and support the master AP in sending information or an instruction in the foregoing methods to the secondary AP, the STA in the BSS corresponding to the master AP, or the first AP. Optionally, the master AP may further include a memory. The memory is configured to be coupled to the processor, and stores a program instruction and data for the master AP.

In a possible implementation, the apparatus includes a processor, a baseband circuit, a radio frequency circuit, and an antenna. The processor is configured to control a function of each circuit part. The baseband circuit is configured to: generate various signaling and messages such as a response message, a master AP selection request message, a master AP indication message, and an acknowledgment message, and send, to the secondary AP or the STA by using the antenna, signaling and messages processed by the radio frequency circuit through processing such as analog conversion, filtering, amplification, and up-conversion. Optionally, the apparatus may further include a memory. The memory stores program instruction and data for the master AP.

In a possible implementation, the apparatus may include a processor and a modem. The processor may be configured to run an instruction or an operating system, to control a function of the master AP. The modem may perform encapsulation, encoding/decoding, modulation/demodulation, equalization, and the like on data according to a protocol to generate a radio frame, to support the master AP in performing a corresponding function in either of the first aspect or the third aspect.

In a possible implementation, when the apparatus is the chip in the master AP, the chip includes a processing module and a transceiver module. For example, the processing module may be a processor. For example, the processor is configured to: generate various messages and signaling, and perform processing such as encoding, modulation, and amplification on various messages obtained through protocol-based encapsulation. The processor may be further configured to perform demodulation, decoding, and decapsulation to obtain the signaling and messages. For example, the transceiver module may be an input/output interface, a pin, or a circuit on the chip. The processing module may execute a computer-executable instruction stored in a storage unit, to support the master AP in performing a corresponding function in the foregoing methods. Optionally, the storage unit may be a storage unit in the chip, such as a register or a cache. Alternatively, the storage unit may be a storage unit that is in the master AP and that is located outside the chip, such as a read-only memory (ROM), another type of static storage device that can store static information and an instruction, or a random access memory (RAM).

In a possible implementation, the apparatus includes a processor. The processor is configured to: be coupled to a memory, read an instruction in the memory, and perform, based on the instruction, the method according to either of the first aspect or the third aspect. The memory may be located inside the processor, or may be located outside the processor.

According to a fifth aspect, an embodiment of this application provides a communications apparatus on a side of a secondary AP. The apparatus may be a secondary AP device, or may be a chip in the secondary AP. The apparatus can implement a function performed by the secondary AP in the second aspect. The function may be implemented by hardware, or may be implemented by hardware executing corresponding software. The hardware or software includes one or more units corresponding to the foregoing function.

In a possible implementation, when the apparatus is a secondary AP, the secondary AP includes a processor and a transceiver. The processor is configured to support the secondary AP in performing a corresponding function in the foregoing methods. The transceiver is configured to: support communication between the secondary AP and a master AP, a STA in a BSS corresponding to the secondary AP, or a first AP, and support the secondary AP in sending information or an instruction in the foregoing methods to the master AP, the STA in the BSS corresponding to the secondary AP, or the first AP. Optionally, the secondary AP may further include a memory. The memory is configured to be coupled to the processor, and stores a program instruction and data for the secondary AP.

In a possible implementation, the apparatus includes a processor, a baseband circuit, a radio frequency circuit, and an antenna. The processor is configured to control a function of each circuit part. The baseband circuit is configured to: generate various signaling and messages such as a response message, a master AP selection request message, a cooperation acknowledgment message, an AP group setup request message, a collaboration group indication message, and a master AP indication message, and send, to the secondary AP or the STA by using the antenna, signaling and messages processed by the radio frequency circuit through processing such as analog conversion, filtering, amplification, and up-conversion. Optionally, the apparatus may further include a memory. The memory stores program instruction and data for the secondary AP.

In a possible implementation, the apparatus may include a processor and a modem. The processor may be configured to run an instruction or an operating system, to control a function of the secondary AP. The modem may perform encapsulation, encoding/decoding, modulation/demodulation, equalization, and the like on data according to a protocol to generate a radio frame, to support the secondary AP in performing a corresponding function in the second aspect.

In a possible implementation, when the apparatus is the chip in the secondary AP, the chip includes a processing module and a transceiver module. For example, the processing module may be a processor. For example, the processor is configured to: generate various messages and signaling, and perform processing such as encoding, modulation, and amplification on various messages obtained through protocol-based encapsulation. The processor may be further configured to perform demodulation, decoding, and decapsulation to obtain the signaling and messages. For example, the transceiver module may be an input/output interface, a pin, or a circuit on the chip. The processing module may execute a computer-executable instruction stored in a storage unit, to support the secondary AP in performing a corresponding function in the foregoing methods. Optionally, the storage unit may be a storage unit in the chip, such as a register or a cache. Alternatively, the storage unit may be a storage unit that is in the secondary AP and that is located outside the chip, such as a read-only memory (ROM), another type of static storage device that can store static information and an instruction, or a random access memory (RAM).

In a possible implementation, the apparatus includes a processor. The processor is configured to: be coupled to a memory, read an instruction in the memory, and perform, based on the instruction, the method according to the second aspect. The memory may be located inside the processor, or may be located outside the processor.

According to a sixth aspect, an embodiment of this application provides a communications apparatus on a side of an access point. The apparatus may be an access point device, or may be a chip in the access point. The apparatus has a function of implementing the third aspect. In an implementation, the apparatus can implement a function performed by the convening AP in the third aspect. The function may be implemented by hardware, or may be implemented by hardware executing corresponding software. The hardware or software includes one or more units corresponding to the foregoing function.

In a possible implementation, when the apparatus is a convening AP, the convening AP includes a processor and a transceiver. The processor is configured to support the convening AP in performing a corresponding function in the method according to the third aspect. The transceiver is configured to: support communication between the convening AP and another AP, and support the convening AP in sending information or an instruction in the foregoing methods to the other AP. Optionally, the convening AP may further include a memory. The memory is configured to be coupled to the processor, and stores a program instruction and data for the convening AP.

In a possible implementation, the apparatus includes a processor, a baseband circuit, a radio frequency circuit, and an antenna. The processor is configured to control a function of each circuit part. The baseband circuit is configured to: generate various signaling and messages such as a response message and a cooperation acknowledgment message, and send, to the other AP by using the antenna, signaling and messages processed by the radio frequency circuit through processing such as analog conversion, filtering, amplification, and up-conversion. Optionally, the apparatus may further include a memory. The memory stores program instruction and data for the convening AP.

In a possible implementation, the apparatus may include a processor and a modem. The processor may be configured to run an instruction or an operating system, to control a function of the convening AP. The modem may perform encapsulation, encoding/decoding, modulation/demodulation, equalization, and the like on data according to a protocol to generate a radio frame, to support the convening AP in performing a corresponding function in the third aspect.

In a possible implementation, when the apparatus is a chip in a convening AP, the chip includes a processing module and a transceiver module. For example, the processing module may be a processor. For example, the processor is configured to: generate various messages and signaling, and perform processing such as encoding, modulation, and amplification on various messages obtained through protocol-based encapsulation. The processor may be further configured to perform demodulation, decoding, and decapsulation to obtain the signaling and messages. For example, the transceiver module may be an input/output interface, a pin, or a circuit on the chip. The processing module may execute a computer-executable instruction stored in a storage unit, to support the convening AP in performing a corresponding function in the foregoing methods. Optionally, the storage unit may be a storage unit in the chip, such as a register or a cache. Alternatively, the storage unit may be a storage unit that is in the convening AP and that is located outside the chip, such as a read-only memory (ROM), another type of static storage device that can store static information and an instruction, or a random access memory (RAM).

In a possible implementation, the apparatus includes a processor. The processor is configured to: be coupled to a memory, read an instruction in the memory, and perform, based on the instruction, the method according to the third aspect. The memory may be located inside the processor, or may be located outside the processor.

The processor mentioned anywhere above may be a general-purpose central processing unit (CPU), a microprocessor, an application-specific integrated circuit (ASIC), or one or more integrated circuits configured to control program execution in the foregoing aspects.

According to a seventh aspect, this application provides a computer-readable storage medium. The computer-readable storage medium stores an instruction, and the instruction may be executed by one or more processors in a processing circuit. When the instruction is run on a computer, the computer is enabled to perform the method according to any one of the first aspect to the third aspect or the possible implementations of the first aspect to the third aspect.

According to an eighth aspect, a computer program product including an instruction is provided. When the computer program product runs on a computer, the computer is enabled to perform the method according to any one of the first aspect to the third aspect or the possible implementations of the first aspect to the third aspect.

According to still another aspect, this application provides a chip system. The chip system includes a processor, configured to support a data sending device in implementing a function in the foregoing aspects, for example, generating or processing data and/or information used in the foregoing aspects. In a possible design, the chip system further includes a memory, and the memory is configured to store a program instruction and data for the data sending device. The chip system may include a chip, or may include a chip and another discrete component.

According to still another aspect, an embodiment of this application provides a wireless communications system. The system includes the master AP and the at least one secondary AP in the foregoing aspects.

According to still another aspect, an embodiment of this application provides a wireless communications system. The system includes the convening AP and the at least one other AP in the foregoing aspects.

BRIEF DESCRIPTION OF DRAWINGS

To describe the technical solutions in this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following clearly and completely describes the technical solutions in this application with reference to the accompanying drawings in this application. Apparently, the described embodiments are merely a part rather than all of the embodiments of this application. All other embodiments obtained by a person of ordinary skill in the art based on the embodiments of this application without creative efforts shall fall within the protection scope of this application.

A beacon frame transmission control method provided in this application may be used in a wireless communications network in which a beacon frame needs to be sent, for example, a wireless local area network (WLAN).

Figure 1:
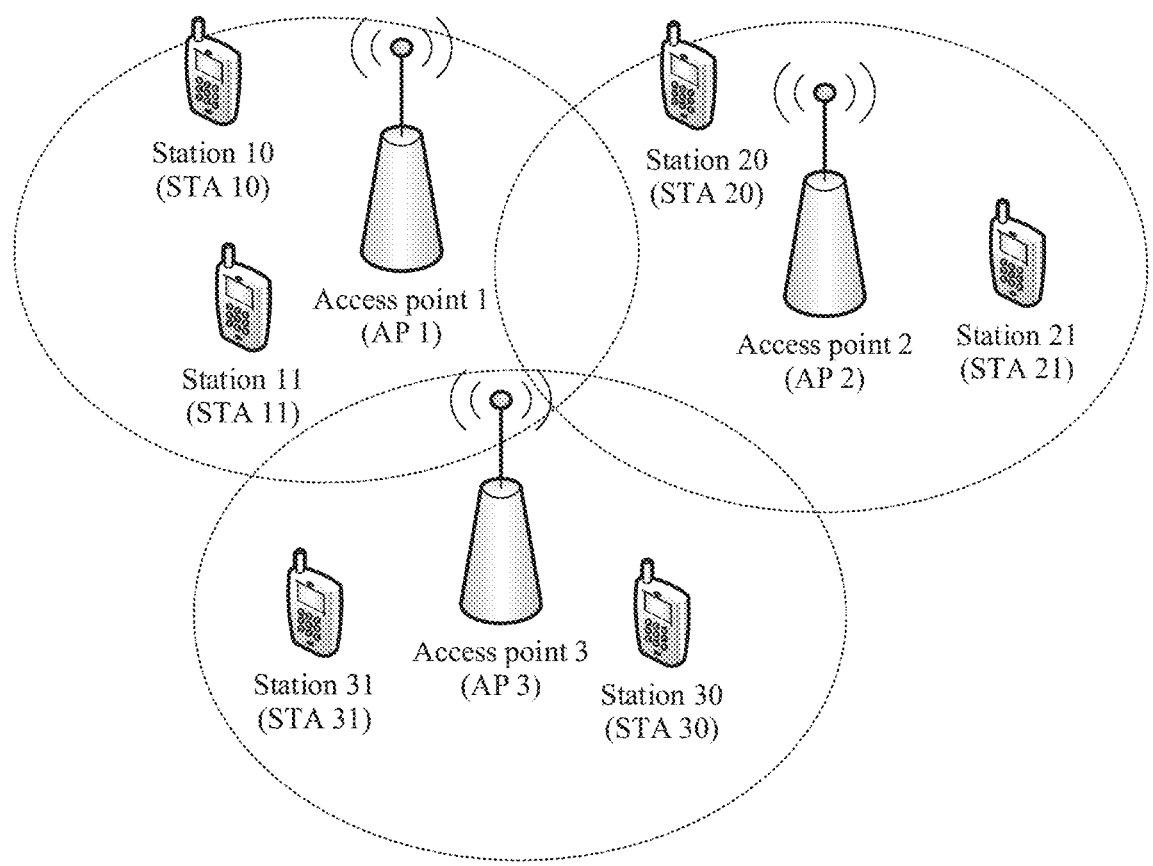
FIG. 1 is a first schematic diagram of a WLAN network.

FIG. 1 is a first schematic diagram of a WLAN network. As shown in FIG. 1, a system structure of the WLAN network may include at least two network side devices and a plurality of terminal side devices. For example, the network side device may be an access point (AP), and the terminal side device may be a station (STA). Each AP and a STA associated with the AP form a BSS. In an implementation provided in this application, the access point AP may be a device configured to communicate with the station. The access point may be any device having a wireless transceiver function or a chip that can be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), or an access point (AP), a wireless relay node, a wireless backhaul node, a transmission point (TP), a transmission reception point (TRP), or the like in a wireless fidelity (Wi-Fi) system, or may be a base station or the like that supports a 5G protocol, a station STA, user equipment, an access terminal, a subscriber unit, a subscriber station, a mobile station, a mobile console, a remote station, a remote terminal, a mobile device, a user terminal, a terminal, a wireless communications device, a user agent, or a user apparatus. The station may alternatively be a cellular phone, a cordless phone, a session initiation protocol (SIP) phone, a station in a wireless local area network, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN), or the like.

A beacon frame is a management frame that carries important functions in a BSS system. With continuous revision of IEEE 802.11 standard, the beacon frame carries more functions, and there is an increasingly high requirement for reliability of the beacon frame. However, on one hand, because the beacon frame is a broadcast frame and does not have an ACK feedback mechanism, robustness of the beacon frame is weaker than that of a unicast frame. On the other hand, in an application scenario of next-generation WLANs technology, the beacon frame is more likely to be interfered with. For example, a high-density deployment scenario is a main scenario for IEEE 802.11ax and next-generation WLANs. In this scenario, there are a large quantity of APs and a large quantity of active stations (active STAs) within limited coverage. Therefore, in the high-density deployment scenario, interference between BSSs is inevitably increased. For another example, a spatial reuse (SR) technology is introduced to IEEE 802.11ax, to further improve a spatial spectrum reuse capability. However, interference between BSSs is further increased by using this technology.

Therefore, how to avoid or reduce interference during beacon frame transmission to further improve transmission robustness of the beacon frame becomes an important problem that needs to be resolved currently and urgently.

In a beacon frame control manner, multi-AP collaboration (AP clustering) is proposed in IEEE 802.11ad. A master AP divides a beacon interval (BI) of the master AP into N equal periods. APs in a collaboration group are allowed to contend for sending beacons only at a start time point of each phase. In this manner, a collision may still occur when secondary APs send beacons.

Figure 2:
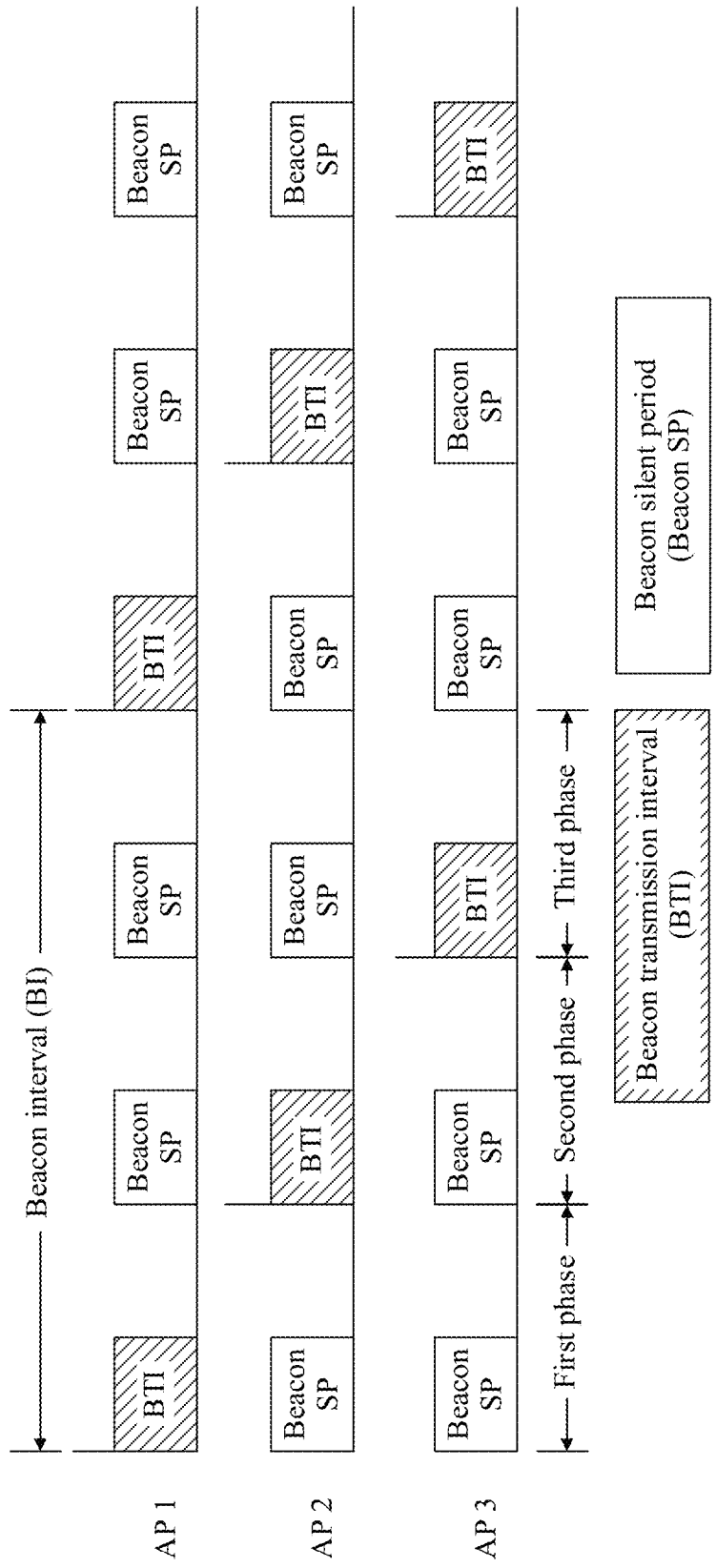
FIG. 2 is a schematic diagram of a beacon frame transmission control method.

FIG. 2 is a schematic diagram of a beacon frame transmission control method. As shown in FIG. 2, an AP 1 is a master AP, an AP 2 and an AP 3 are secondary APs, and a BI of the AP 1 is divided into three periods. First, the AP 1 sends a beacon at a start time point of a first phase. The AP 1 confirms a beacon transmission interval of the AP 1, and then sets the AP 1 to enter a beacon silent period (Beacon SP) at a start time point of (N−1) time periods other than the first phase. For example, data transmission in a BSS corresponding to the AP 1 is prohibited from start time points of a second phase and a third phase. Then, the AP 2 and the AP 3 contend for sending beacon frames at the start time point of the second phase. In this case, the beacon frames of the AP 2 and the AP 3 may still collide with each other. It can be learned that transmission robustness of beacon frames of the secondary APs may still be reduced due to interference. Then, after the secondary APs sequentially confirm beacon transmission intervals of the secondary APs, each secondary AP may set the secondary AP to enter the beacon SP in other (N−1) beacon time periods, to prohibit transmission in the BSS. A beacon transmission interval (BTI) is transmission duration of a beacon of each AP.

In addition, in another beacon frame control manner, a beacon timing advertisement mechanism and a target beacon transmission time (TBTT) mechanism are proposed in 802.11s (a distributed self-organizing network). Both an AP and a STA are defined as mesh STAs. As defined in the beacon timing advertisement mechanism, a mesh STA collects beacon information of another neighbor mesh STA, and then broadcasts the beacon information of the neighbor mesh STA in a beacon frame of the mesh STA.

Figure 3:
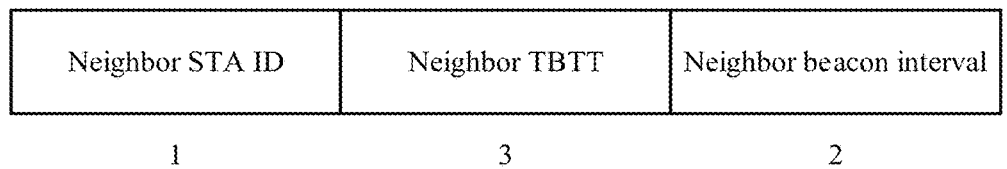
FIG. 3 is a schematic structural diagram of beacon information.

FIG. 3 is a schematic structural diagram of beacon information. As shown in FIG. 3, a beacon frame of a neighbor mesh STA may include beacon information that is of the neighbor mesh STA and that is represented by an octet (Octets). The beacon frame includes a neighbor STA identifier (Neighbor STA ID), located in a first byte, of the neighbor mesh STA, a neighbor TBTT identifier (Neighbor TBTT), located in a third byte, of the neighbor mesh STA, and a beacon interval, located in a second byte, of the neighbor mesh STA.

A TBTT selection mechanism may be described as follows: A mesh STA receives beacon information of a neighbor mesh STA and beacon timing advertisement information carried in a beacon, and selects TBTT of the mesh STA to avoid a beacon of the neighbor mesh STA. It should be noted that the mechanism is implemented in a distributed spontaneous manner. Currently, a mesh STA 1 obtains beacon information of a neighbor mesh STA 2. The mesh STA 1 can determine only a beacon transmission interval that does not collide with that of the mesh STA 2. In other words, negotiation or scheduling of a time point and a period for sending beacons between APs are not included in this control manner; and consequently, a collision may still occur when the mesh STA 1 and another mesh STA that is far away from the mesh STA 1 send beacons.

To resolve the foregoing problem, this application provides a beacon frame transmission control method. In an AP collaboration group, a master AP generates indication information used to indicate a transmission time period of a beacon frame of at least one secondary AP, and sends the indication information to the at least one secondary AP, where transmission time periods of beacon frames of all APs in the AP collaboration group do not collide with each other, so that each secondary AP in the AP collaboration group sends a beacon frame of the secondary AP in the transmission time period, indicated by the master AP, of the beacon frame. Therefore, a collision can be avoided when the APs in the AP collaboration group send beacons, thereby improving transmission robustness of the beacon frame. In addition, in a transmission time period of a beacon frame of an AP in the AP collaboration group, each of other APs in the AP collaboration group may prohibit data transmission in a BSS corresponding to the other AP, so that mutual interference between data transmitted in the AP collaboration group and the beacon frame can be further avoided.

The following describes in detail a beacon frame transmission control method provided in this application.

Embodiment 1

Figure 4:
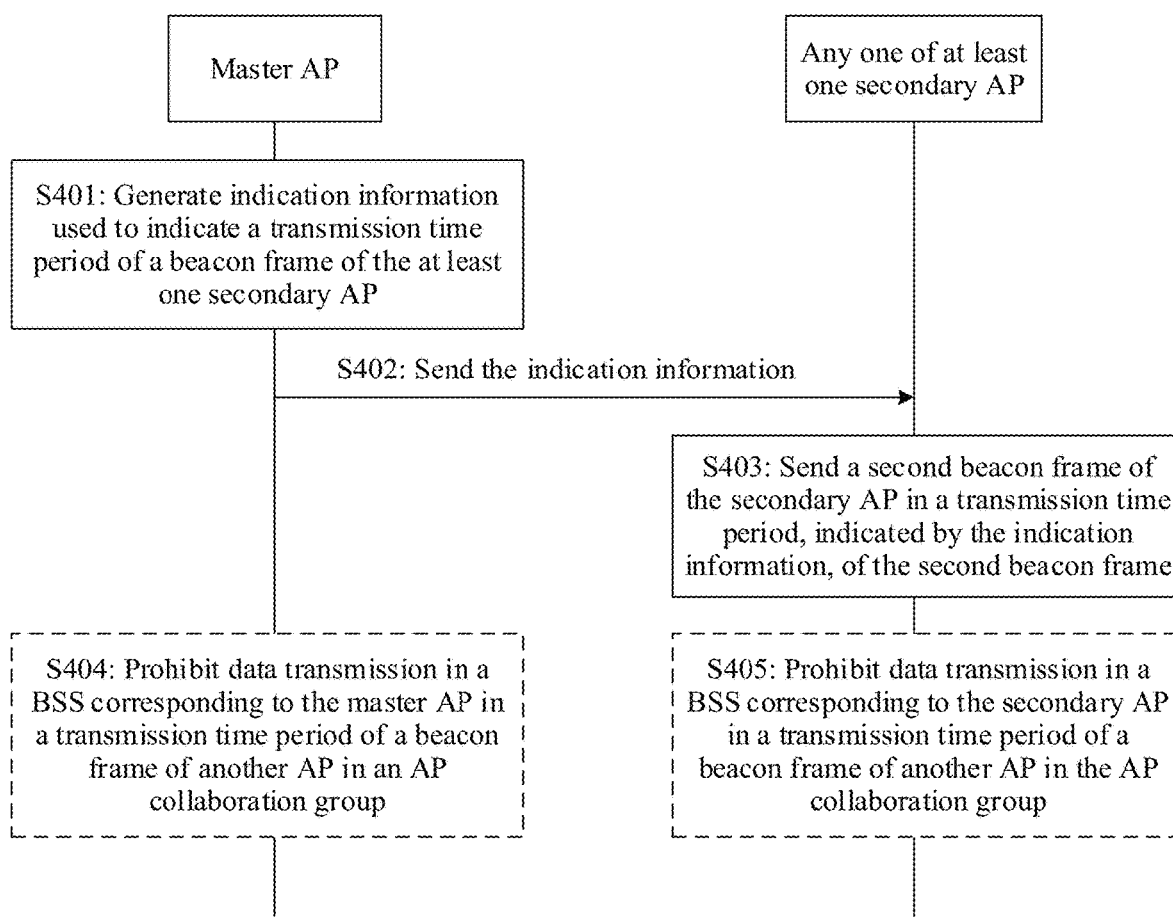
FIG. 4 is a first flowchart of a beacon frame transmission control method according to this application.

FIG. 4 is a first flowchart of a beacon frame transmission control method according to this application. As shown in FIG. 4, the beacon frame transmission control method provided in this application may include the following steps.

S401: A master AP generates indication information used to indicate a transmission time period of a beacon frame of at least one secondary AP.

The master AP and the at least one secondary AP may belong to a same AP collaboration group.

In this application, the AP collaboration group may be an AP cluster in 802.11ad, or may include a virtual AP in a next-generation WLAN, or may be a set of APs that are aggregated in another organization manner. In an implementation provided in this application, an AP may be a network device such as a mesh STA in 802.11s.

In this application, the AP collaboration group and the master AP may be determined before the master AP generates the indication information.

In an example, the master AP may be determined before the AP collaboration group is determined. For example, among a plurality of APs, the master AP may be determined based on factors such as a quantity of neighbor APs of each AP and a beacon transmission interval of each AP. Then, the master AP may determine whether another AP in the plurality of APs is willing to join an AP collaboration group corresponding to the master AP. If the other AP agrees to join the AP collaboration group, the other AP in the AP collaboration group is the secondary AP. For another example, the master AP may be any one of the APs, provided that the master AP determines that some or all of other APs in the APs are willing to join the AP collaboration group corresponding to the master AP.

In another example, the AP collaboration group may be determined before the master AP corresponding to the AP collaboration group is determined.

For example, in an implementation provided in this application, the master AP may be an AP having a largest quantity of neighbor APs in the AP collaboration group.

In this application, there may be one or more secondary APs. Referring to FIG. 1, the AP collaboration group may include an AP 1, an AP 2, and an AP 3, where the AP 1 may be the master AP, and the AP 2 and the AP 3 may be the secondary APs. A BSS corresponding to each AP may include one or more stations STAs. Referring to FIG. 1, a BSS corresponding to the AP 1 may include two stations: a STA 10 and a STA 11, a BSS corresponding to the AP 2 may include two stations: a STA 20 and a STA 21, and a BSS corresponding to the AP 3 may include two stations: a STA 30 and a STA 31. The master AP may allocate a transmission time period of a beacon frame to each AP in the AP collaboration group, and transmission time periods that are of beacon frames and that are allocated by the master AP to the APs in the AP collaboration group are different. For example, transmission time periods of beacon frames of any two APs in the AP collaboration group may not overlap each other.

In this application, there may be one or more pieces of indication information. In an example, the master AP may generate one piece of indication information, and the indication information is used to indicate transmission time periods of beacon frames of all the secondary APs. In another example, the master AP may generate a plurality of pieces of indication information, and each piece of indication information is used to indicate a transmission time period of a beacon frame of one or more secondary APs.

S402: The master AP sends the indication information to the at least one secondary AP.

In this application, the master AP may send the indication information to the secondary AP in a plurality of manners. For example, a beacon frame of the master AP may be referred to as a first beacon frame, and a beacon frame of each secondary AP may be referred to as a second beacon frame corresponding to each secondary AP.

In an example, the beacon frame of the at least one secondary AP is at least one second beacon frame. The step in which the master AP sends the indication information to the at least one secondary AP may include: The master AP may send the first beacon frame, where the first beacon frame may include the indication information, and the indication information is used to indicate a transmission time period of the at least one second beacon frame. In this example, the first beacon frame of the master AP may carry the indication information used to indicate the transmission time periods of the beacon frames of all the secondary APs. Then, the master AP may notify, by using the first beacon frame, each secondary AP in the AP collaboration group of the allocated transmission time period of the second beacon frame. It should be noted that the master AP may send the first beacon frame of the master AP within a beacon interval (BI) of the master AP.

In another example, the master AP may alternatively indicate the transmission time period of the second beacon frame to each secondary AP by using another type of frame or message. For example, the indication information may be sent to each secondary AP after the AP collaboration group is set up. For example, the master AP may send, to each secondary AP, the indication information used to indicate the transmission time period of the second beacon frame of each secondary AP, or may send, to each secondary AP, indication information used to indicate a transmission time period of a second beacon frame of a secondary AP of a recipient.

In this application, any target secondary AP in the at least one secondary AP may receive the indication information that is sent by the master AP and that is used to indicate the transmission time period of the beacon frame of the at least one secondary AP. Then, the target secondary AP may send a beacon frame of the target secondary AP in the transmission time period, indicated by the indication information, of the beacon frame.

S403: The secondary AP sends the second beacon frame of the secondary AP in the transmission time period, indicated by the indication information, of the second beacon frame.

In this application, after receiving the indication information, the secondary AP may extract the transmission time period of the second beacon frame of the secondary AP from the indication information, and then start to send the second beacon frame of the secondary AP when the allocated transmission time period of the second beacon frame arrives. For example, the AP 2 and the AP 3 may start to send second beacon frames of the AP 2 and the AP 3 when transmission time periods of the second beacon frames of the AP 2 and the AP 3 arrive.

In this application, the indication information may have a plurality of forms. For details, refer to descriptions of the indication information in other embodiments of this application. Optionally, the method may further include: S404: The master AP prohibits data transmission in a BSS corresponding to the master AP in a transmission time period of a beacon frame of the other AP in the AP collaboration group.

In this application, the master AP may prohibit data transmission in the BSS corresponding to the master AP in the transmission time period of the beacon frame of the other AP in the AP collaboration group. For example, the BSS of the AP 1 may include the STA 10 and the STA 11. In this case, the AP 1 may prohibit data transmission between the AP 1, the STA 10, and the STA 11 in the transmission time periods of the second beacon frames of the AP 2 and the AP 3.

In this application, before the transmission time period of the beacon frame of the other AP arrives, the master AP may send a silence period indication to a STA in the BSS of the master AP, where the silence period indication is used to indicate the STA in the BSS corresponding to the master AP to prohibit data transmission in the transmission time period of the second beacon frame of the at least one secondary AP. The master AP may prohibit data transmission in the BSS corresponding to the master AP in a plurality of implementations. For details, refer to descriptions of the implementations of prohibiting data transmission in a BSS in other embodiments of this application.

Optionally, the method may further include: S405: The secondary AP prohibits data transmission in a BSS corresponding to the secondary AP in a transmission time period of a beacon frame of another AP in the AP collaboration group.

In this application, any target secondary AP in the AP collaboration group may prohibit data transmission in a BSS corresponding to the target secondary AP in the transmission time period of the beacon frame of the other AP in the AP collaboration group. For example, the AP 2 may prohibit, in transmission time periods of beacon frames of the AP 1 and the AP 3, data transmission in the BSS corresponding to the AP 2. The AP 3 may prohibit, in transmission time periods of beacon frames of the AP 1 and the AP 2, data transmission in the BSS corresponding to the AP 3.

In this application, before the transmission time period of the beacon frame of the other AP in the AP collaboration group arrives, the target secondary AP may send a silence period indication to a STA in the BSS of the target secondary AP, where the silence period indication is used to indicate the STA in the BSS corresponding to the target secondary AP to prohibit data transmission in the transmission time period of the beacon frame of the other AP in the AP collaboration group. The target secondary AP may prohibit data transmission in the BSS corresponding to the target secondary AP in a plurality of implementations. For details, refer to descriptions of prohibiting data transmission in a BSS in other embodiments of this application.

It should be noted that step S404 and step S405 are not mandatory steps in this embodiment of this application. For example, in the transmission time period of the beacon frame of the AP 2, the AP 1 serving as the master AP may perform S404 and the AP 3 serving as the secondary AP may perform S405, provided that either of the AP 1 and the AP 3 can prohibit data transmission performed by the STA in the BSS, so that interference to the beacon frame of the AP 2 can be reduced, thereby improving transmission robustness of the beacon frame of the AP 2. In addition, within the BI of the master AP, any secondary AP may perform step S403 once, and perform step S404 one or more times. Step S403 may be performed before step S404, or may be performed after step S404, or may be performed between a plurality of times of S404. In addition, different secondary APs, such as the AP 2 and the AP 3, may further perform S405 simultaneously in the transmission time period of the beacon frame of the AP 1.

According to the beacon frame transmission control method provided in this application, because the secondary AP in the AP collaboration group sends the second beacon frame of the secondary AP only in the transmission time period, allocated to the secondary AP, of the second beacon frame, it can be ensured that there is no collision between the beacon frames of the APs in the AP collaboration group, thereby improving transmission robustness of the beacon frames.

Further, in a transmission time period of a beacon frame of an AP in the AP collaboration group, the other AP in the AP collaboration group may prohibit data transmission in a BSS corresponding to the other AP, so that mutual interference between data transmitted in the AP collaboration group and the beacon frame is avoided, thereby improving transmission robustness of the beacon frame.

Embodiment 2

This application further provides a beacon frame transmission control method. Based on the embodiment shown in FIG. 4, for the step in which the master AP generates the indication information used to indicate the transmission time period of the beacon frame of the at least one secondary AP, and sends the indication information to the at least one secondary AP, the following implementation may alternatively be used.

In this application, for the indication information that is generated by the master AP and that is used to indicate the transmission time period of the second beacon frame of the at least one secondary AP, the following forms of implementations may be used.

In a first implementation, the indication information may include at least one time interval and identification information that is used to indicate the at least one secondary AP, where the at least one time interval is in a one-to-one correspondence with the at least one secondary AP, and each of the at least one time interval is used to indicate a time difference between a transmission time point of a second beacon frame of a corresponding secondary AP and an end time point of the first beacon frame. The time interval may also be referred to as a time offset.

For example, the first implementation may be used in a process in which the master AP indicates, in an explicit scheduling manner, the transmission time period of the second beacon frame of the at least one secondary AP. In the explicit scheduling manner, the master AP may directly determine a transmission time period of a beacon frame of each secondary AP, and send information that carries the transmission time period to each secondary AP.

Figure 5:
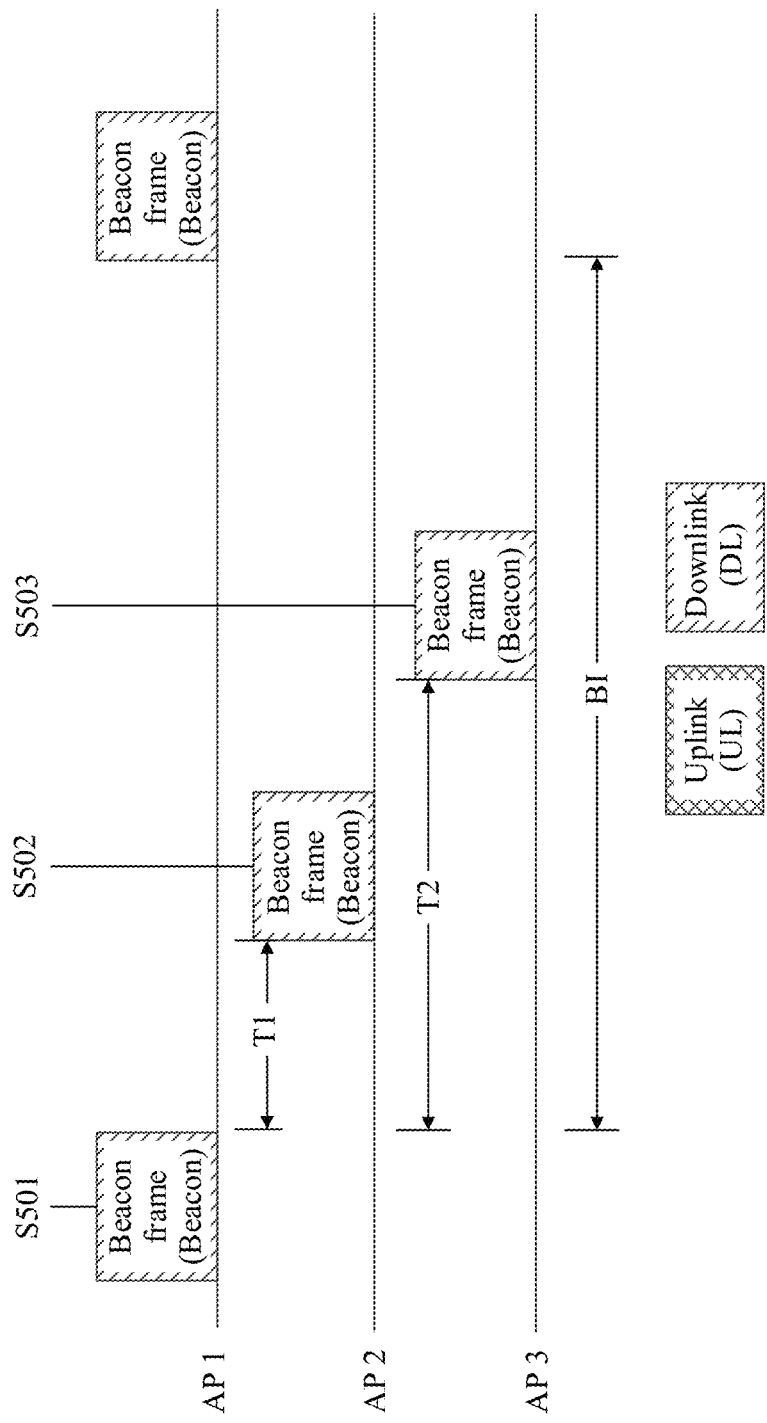
FIG. 5 is a first schematic flowchart of a beacon frame transmission control method according to this application.

FIG. 5 is a first schematic flowchart of a beacon frame transmission control method according to this application. As shown in FIG. 5, an AP 1 is a master AP, and an AP 2 and an AP 3 are secondary APs. A process of interaction between the master AP and the secondary AP may include the following steps.

S501: The AP 1 sends a first beacon frame, where the first beacon frame includes a transmission time period T and address information addr of at least one secondary AP.

In this application, a new element type may be defined in the first beacon frame of the master AP. The transmission time period T and the address information addr of the secondary AP may be written into the element, to indicate a transmission time point of a beacon frame of another secondary AP. The addr may be an identifier of an AP.

For example, the identifier of the AP may be at least of the following information:
 a MAC address of the AP;
 a BSS ID of the AP in a BSS;
 a virtual AP ID;
 an ID of the AP in a personal basic service set (PBSS) control point (PCP);
 an ID of the AP in an AP cluster; or
 a BSS color of the AP in a B S S.

In this application, the transmission time period T may be used to indicate the secondary AP to wait for, after receiving the first beacon frame of the master AP, the transmission time period T before sending a beacon frame. For example, a plurality of pieces of [T, addr] information, for example, [T1, AP 2] and [T2, AP 3], may be filled in the first beacon frame. In this way, the first beacon frame of the AP 1 can be used to indicate that a transmission time point of a second beacon frame of the AP 2 is a time point after a time period T1 after the first beacon frame of the AP 1 is received, and can be used to indicate that a transmission time point of a second beacon frame of the AP 3 is a time point after a time period T2 after the first beacon frame of the AP 1 is received.

Table 1 is a schematic diagram of the indication information according to this application.

TABLE 1

| T1 | Identifier of an AP 2 |
| T2 | Identifier of an AP 3 |

In still another possible implementation, the first beacon frame may include transmission time period information TI and address information addr of the at least one secondary AP. Transmission time period information of a second beacon frame of a first secondary AP may be a time difference between a transmission time point of the second beacon frame of the first secondary AP and a transmission time point of the first beacon frame. Each piece of transmission time period information of second beacon frames of a second secondary AP and a subsequent secondary AP may be a time difference between a transmission time point of the current second beacon frame and a transmission time point of a previous second beacon frame.

For example, there may be a plurality of pieces of transmission time period information [ΔT, addr]. For example, FIG. 5 is used as an example. Information corresponding to the AP 2 is [T1, addr], and information corresponding to the AP 3 is [T2-T1, addr]. In this case, AT corresponding to the AP 2 is T1, and a transmission time point of a second beacon frame of the AP 2 is a time point after a time period T1 after the first beacon frame is received; and AT corresponding to the AP 3 is T2-T1, and a transmission time point of a second beacon frame of the AP 3 is a time point after a time period T2-T1 after a transmission time point of a second beacon frame of the AP 2. In other words, the transmission time point of the second beacon frame of the AP 3 is a time point after a time period T2 after the first beacon frame is received. According to this solution, because only information about a time difference (T2-T1) is carried, signaling overheads of this solution are lower than that of the previous solution.

Table 2 is still another schematic diagram of transmission time period information according to this application.

TABLE 2

| T1 | Identifier of an AP 2 |
|---|---|
| T2 − T1 | Identifier of an AP 3 |

S502: After receiving the first beacon frame of the AP 1, the AP 2 waits for the time period T1 before sending the second beacon frame of the AP 2.

S503: After receiving the first beacon frame of the AP 1, the AP 3 waits for the time period T2 before sending the second beacon frame of the AP 2.

It should be noted that, a horizontal axis of the schematic flowchart provided in this application is a time axis, DL represents downlink, and UL represents uplink. Each secondary AP may preempt a channel by using a point coordination function (PCF) interframe space (PISF) before an allocated transmission time period of a beacon frame arrives.

For example, T1 and T2 each may be a positive integer multiple of a BI of the master AP divided by a total quantity of APs. Alternatively, in an implementation provided in this application, a difference between T1 and T2 may not be a positive integer multiple of a BI divided by a total quantity of APs.

In the explicit scheduling manner, the master AP schedules the transmission time period of the beacon frame of the other AP in the group, so that a beacon collision between the secondary APs can be avoided.

In a second implementation of the indication information, the BI of the master AP may be divided into several time periods. For example, the BI of the master AP may be divided into N equal time periods, where N minus 1 is equal to a quantity of secondary APs in the at least one secondary AP, that is, N is a total quantity of master APs and secondary APs in the AP collaboration group. The transmission time period of the first beacon frame of the master AP may correspond to a first equal time period in the N equal time periods.

Based on this, the indication information may include a list (an AP List) of the at least one secondary AP, where (N−1) equal time periods in the N equal time periods other than the first equal time period may be in a one-to-one correspondence with the at least one secondary AP, and a transmission time period of a second beacon frame of any one of the at least one secondary AP belongs to an equal time period corresponding to a location of the secondary AP in the AP list.

Figure 6A:
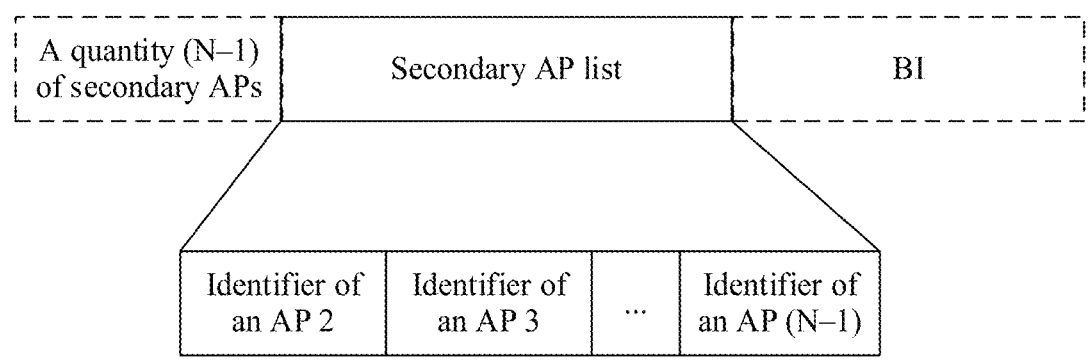
FIG. 6A is a first schematic structural diagram of indication information according to this application.

FIG. 6A is a first schematic structural diagram of indication information according to this application.

As shown in FIG. 6A, the indication information may include a total quantity of secondary APs, a list of at least one secondary AP, and a BI, where N is a total quantity of APs. The total quantity of secondary APs and the BI may alternatively not be included in the indication information. For an implementation of an identifier of each secondary AP, refer to descriptions in the first implementation.

It may be understood that the indication information may alternatively include a list of at least one secondary AP. Optionally, the indication information may further include a total quantity N of APs (including a master AP and a secondary AP). In this case, a secondary AP that receives the indication information may obtain, based on the total quantity N of APs, that a quantity of secondary APs is N−1.

It should be noted that the secondary AP list may indicate a sequence of transmission time periods of second beacon frames of the secondary APs by using a location of each secondary AP in the list. The secondary AP list may include identification information of each secondary AP. The identification information of the secondary AP may be any implementation of the identifier of the AP described in the first implementation. For example, the identification information may be a BSS ID corresponding to the secondary AP. When the secondary AP receives the list, carried in the indication information, of the at least one secondary AP, an equal time period corresponding to the secondary AP may be determined based on a location of an AP identifier of the secondary AP in the AP list. For example, if an identifier of an AP 2 is in a first location in the secondary AP list, and an identifier of an AP 3 is in a second location, the AP 2 may correspond to a first equal time period in (N−1) equal time periods other than a first equal time period, namely, a second equal time period in N equal time periods, and the AP 3 may correspond to a second equal time period, namely, a third equal time period in the N equal time periods. It should be further noted that, a transmission time period of a second beacon frame of each secondary AP may be a corresponding equal time period, or a transmission time period of a second beacon frame of each secondary AP may belong to a corresponding equal time period, in other words, the transmission time period of the second beacon frame of each secondary AP may be a portion of the corresponding equal time period. For example, the transmission time period of the second beacon frame of each secondary AP may be a start time period of the corresponding equal time period.

For example, the second implementation of the indication information may be used in a process in which the master AP indicates, in an implicit scheduling manner, a transmission time point of the second beacon frame of the at least one secondary AP.

Figure 6B:
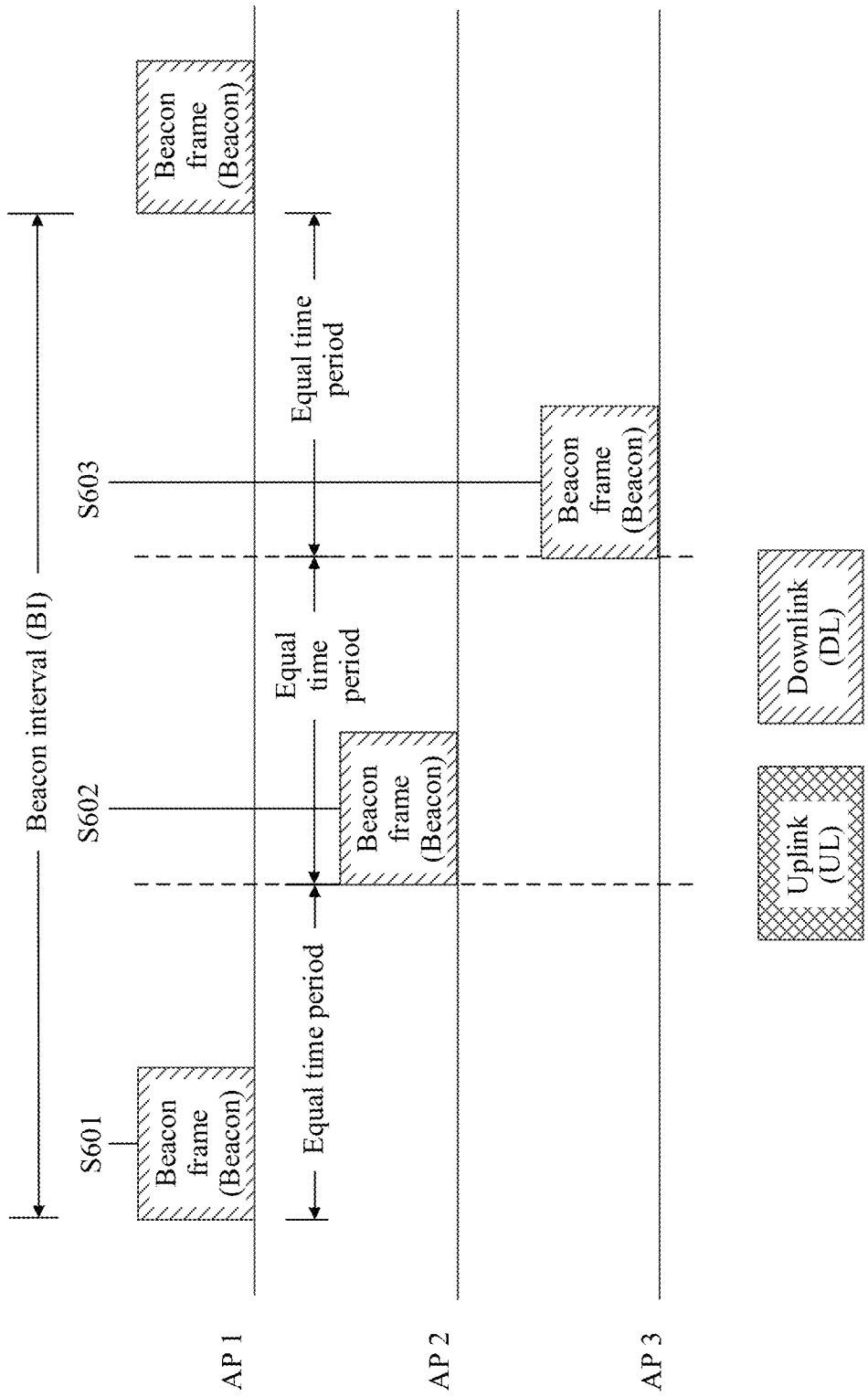
FIG. 6B is a second schematic flowchart of a beacon frame transmission control method according to this application.

FIG. 6B is a second schematic flowchart of a beacon frame transmission control method according to this application. As shown in FIG. 6B, an AP 1 is a master AP, and an AP 2 and an AP 3 are secondary APs. A process of interaction between the master AP and the secondary AP may include the following steps.

S601: The AP 1 sends a first beacon frame, where the first beacon frame of the AP 1 includes an AP list and a total quantity N of APs.

Similar to the explicit scheduling manner, a new element type may be defined in the first beacon frame. The new element type includes the AP list, and may also be referred to as a secondary AP sending list, namely, a sending sequence of second beacon frames of the secondary APs. In addition, the new element type may further include an equal time period determined based on a quantity of secondary APs and a BI of the master AP, namely, an equal time period obtained by dividing the BI by N. For example, a transmission time point of a second beacon frame of a first secondary AP in the secondary AP sending list may be a time point after the first secondary AP waits from a start moment of a current BI to an end of a first equal time period. A transmission time point of a second beacon frame of a second secondary AP in the secondary AP sending list may be a time point after the second secondary AP waits from a transmission time point of the first beacon frame of the master AP to an end of a second equal time period. For example, with reference to FIG. 1, the secondary AP sending list may include the AP 2 and the AP 3. To be specific, the AP 2 is the first secondary AP in the secondary AP sending list, and the AP 3 is the second secondary AP in the secondary AP sending list.

S602: After receiving the first beacon frame of the AP 1, the AP 2 waits from the start moment of the current BI to the end of the first equal time period before sending a second beacon frame of the AP 2.

After receiving the first beacon frame, the AP 2 may determine, from the secondary AP sending list, a location of an identifier of the AP 2, for example, a first location; then determine the equal time period based on the BI and N in the first beacon frame; and then determine a transmission time point of the second beacon frame of the AP 2 based on the equal time period and the location.

It should be noted that, in an implementation provided in this application, the first beacon frame may alternatively not include the total quantity N of APs. Each secondary AP may determine a total quantity M of secondary APs based on the secondary AP sending list. If a quantity of master APs is 1, N is equal to M+1.

In this application, a transmission time point of a second beacon frame of each secondary AP may be determined as a time point after the secondary AP waits from an end time point of the first beacon frame to an end of the equal time period obtained after being multiplied by a location of the secondary AP. For example, the transmission time point of the second beacon frame of the AP 2 may be a time point after the AP 2 waits from the end time point of the first beacon frame to an end of the equal time period obtained after being multiplied by 1.

S603: After receiving the first beacon frame of the AP 1, the AP 3 waits from the start moment of the current BI to the end of the second equal time period before sending a second beacon frame of the AP 3.

If a location of the AP 3 in the secondary AP sending list is a second location, a transmission time point of the second beacon frame of the AP 3 may be a time point after the AP 3 waits from the end time point of the first beacon frame to an end of the equal time period obtained after being multiplied by 2.

It should be further noted that, in an implementation provided in this application, N time periods may alternatively be unequal time periods. In this case, the indication information may include specific duration of each unequal time period, or duration of N unequal time periods may be obtained in advance by each secondary AP.

In the implicit scheduling manner, a beacon frame collision between the secondary APs can also be avoided. In addition, the beacon interval is equally divided, and the location of the secondary AP in a secondary AP sending list can be used to indicate the transmission time point of the second beacon frame of the secondary AP, thereby reducing signaling overheads.

In a third implementation of the indication information, the BI of the master AP may alternatively be divided into several time periods. For example, the BI of the master AP may be divided into N equal time periods, where N minus 1 is equal to a quantity of secondary APs in the at least one secondary AP, that is, N is a total quantity of master APs and secondary APs in the AP collaboration group. The transmission time period of the first beacon frame of the master AP may correspond to a first equal time period in the N equal time periods.

Based on this, the indication information may include a list of the at least one secondary AP and (N−1) time period numbers, where the (N−1) time period numbers indicate (N−1) equal time periods in the N equal time periods other than the first equal time period, the (N−1) time period numbers are in a one-to-one correspondence with the secondary APs in the list of the at least one secondary AP, and a transmission time period of a second beacon frame of any one of the at least one secondary AP belongs to a equal time period indicated by a time period number corresponding to the secondary AP.

Figure 6C:
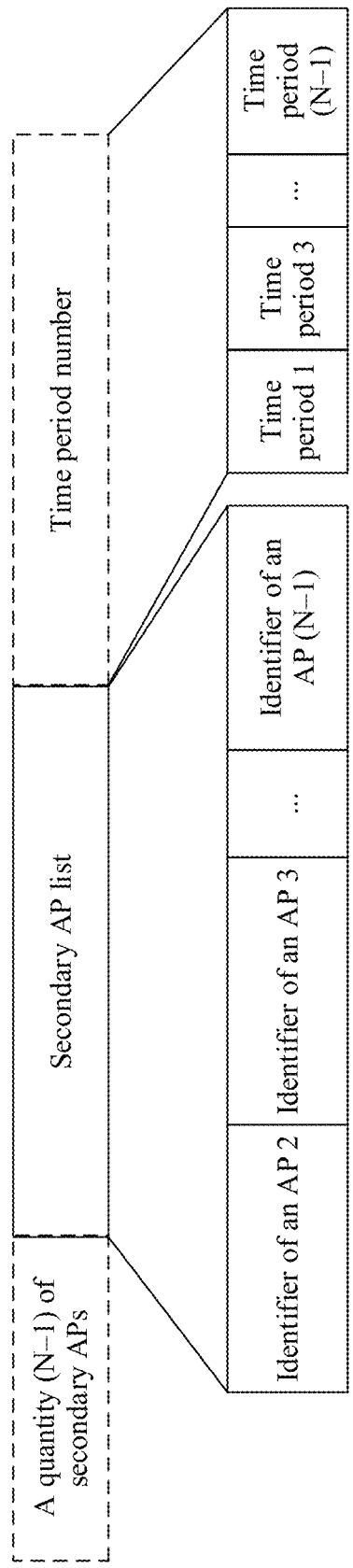
FIG. 6C is a second schematic structural diagram of indication information according to this application.

FIG. 6C is a second schematic structural diagram of indication information according to this application.

It should be noted that the secondary AP list is used to indicate a location of each secondary AP in the list. When the secondary AP receives the list, carried in the indication information, of the at least one secondary AP, the secondary AP may determine, from the (N−1) time period numbers based on a location of an AP identifier of the secondary AP in the AP list, a time period number corresponding to the secondary AP.

In an example, if a location of an identifier of an AP 2 in the AP list may be a first location, the AP 2 may correspond to a time period corresponding to a first time period number in the (N−1) time period numbers. If a location of an identifier of an AP 3 in the AP list may be a second location, the AP 3 may correspond to a time period corresponding to a second time period number in the (N−1) time period numbers. In still another example, if a location of an identifier of an AP 2 in the AP list may be a second location, the AP 2 may correspond to a time period corresponding to a second time period number in the (N−1) time period numbers. If a location of an identifier of an AP 3 in the AP list may be a first location, the AP 3 may correspond to a time period corresponding to a first time period number in the (N−1) time period numbers. The third implementation of the indication information may also be used in the implicit scheduling manner.

According to the implementations of the indication information provided in this application, the master AP can flexibly indicate the transmission time period of the second beacon frame of the secondary AP, so that a beacon transmission collision between the APs in the AP collaboration group is avoided. In addition, the indication information has a relatively small data length, so that the first beacon frame can carry a relatively small amount of information. For details and technical effects of other technical solutions in this embodiment of this application, refer to descriptions in other embodiments of this application.

Embodiment 3

This application further provides a beacon frame transmission control method. Based on the foregoing embodiments, the step in which the master AP prohibits data transmission in the BSS in the transmission time period of the beacon frame of the other AP in the AP collaboration group in step S404 may be implemented in a manner in which the master AP may send the silence period indication to the STA in the BSS corresponding to the master AP. In this manner, the STA in the BSS corresponding to the master AP may be indicated to prohibit data transmission in a transmission time period of a beacon frame of another AP in the AP collaboration group than the master AP.

Similarly, the step in which the secondary AP prohibits data transmission in the BSS in the transmission time period of the beacon frame of the other AP in the AP collaboration group in step S405 may be implemented in a manner in which the secondary AP may send the silence period indication to the STA in the BSS corresponding to the secondary AP. In this manner, the STA in the BSS corresponding to the secondary AP may be indicated to prohibit data transmission in a transmission time period of a beacon frame of another AP in the AP collaboration group than the secondary AP. It should be noted that, for the secondary AP, the other AP in the AP collaboration group than the secondary AP may be the master AP, or may be another secondary AP than the secondary AP.

For example, for the silence period indication, the following plurality of implementations may be used.

In a first implementation of the silence period indication, prohibition of data transmission in the BSS may be set based on target wake time (TWT). This manner may also be referred to as a TWT-based avoidance transmission manner.

For example, the master AP may include the target wake time in the beacon frame of the master AP before a transmission time period of a beacon frame of any other AP in the AP collaboration group arrives, and send the beacon frame to the STA in the BSS corresponding to the master AP. The secondary AP may include the target wake time in the beacon frame of the secondary AP before a transmission time period of a beacon frame of any other AP in the AP collaboration group arrives, and send the beacon frame to the STA in the BSS corresponding to the secondary AP.

In this application, a new type of TWT, namely, silent TWT may be defined. The silent TWT may also be referred to as a silent service period (Silent SP). Both the silent TWT and the silent service period may be information element (IE) in a frame. Each information element may include one field or a group of fields, and each field may be referred to as a field. For example, both the silent TWT and the silent service period may include a start time field and a service time field.

In this application, a value of the start time field may be a time offset, and the time offset is used to indicate the STA to start to keep silent at a moment after the time offset is delayed from an end time point of the beacon frame that carries the target wake time. The service time field is used to indicate duration in which the STA needs to keep silent. For example, the value of the start time field may be a time offset between a transmission time point of the beacon frame of the other AP and an end time point of a beacon frame that carries the silent service period. Refer to TWT 1 shown in FIG. 7. A value of the service time field may be transmission duration of the beacon frame. In some scenarios, the transmission duration of the beacon frame may also be referred to as a beacon transmission interval (BTI).

During actual application, the master AP may send a first beacon frame of the master AP to the STA in the BSS of the master AP, where the first beacon frame may include a silent service period. The silent service period is used to indicate the STA in the BSS corresponding to the master AP to prohibit data transmission in the transmission time period of the second beacon frame of the at least one secondary AP. A value of a start time field of the silent service period is a time offset between an end time point of the first beacon frame and a transmission time point of the second beacon frame of the at least one secondary AP. A value of a service time field of the silent service period is transmission duration of the second beacon frame of the at least one secondary AP.

Any target secondary AP in the at least one secondary AP sends a second beacon frame of the target secondary AP to the STA in the BSS of the target secondary AP, where the second beacon frame may include a silent service period. The silent service period is used to indicate the STA in the BSS corresponding the target secondary AP to prohibit data transmission in the transmission time period of the beacon frame of the other AP in the AP collaboration group. A value of a start time field of the silent service period is a time offset between an end time point of the second beacon frame of the target secondary AP and a transmission time point of the beacon frame of the other AP in the AP collaboration group. A value of a service time field of the silent service period is transmission duration of the beacon frame of the other AP.

It should be noted that, for the master AP, the transmission time period of the beacon frame of the other AP is a transmission time period of a second beacon frame of each secondary AP in the AP collaboration group; and for the target secondary AP, transmission time periods of beacon frames of other APs are the transmission time period of the first beacon frame of the master AP and a transmission time period of a beacon frame of another secondary AP than the target secondary AP.

Figure 7:
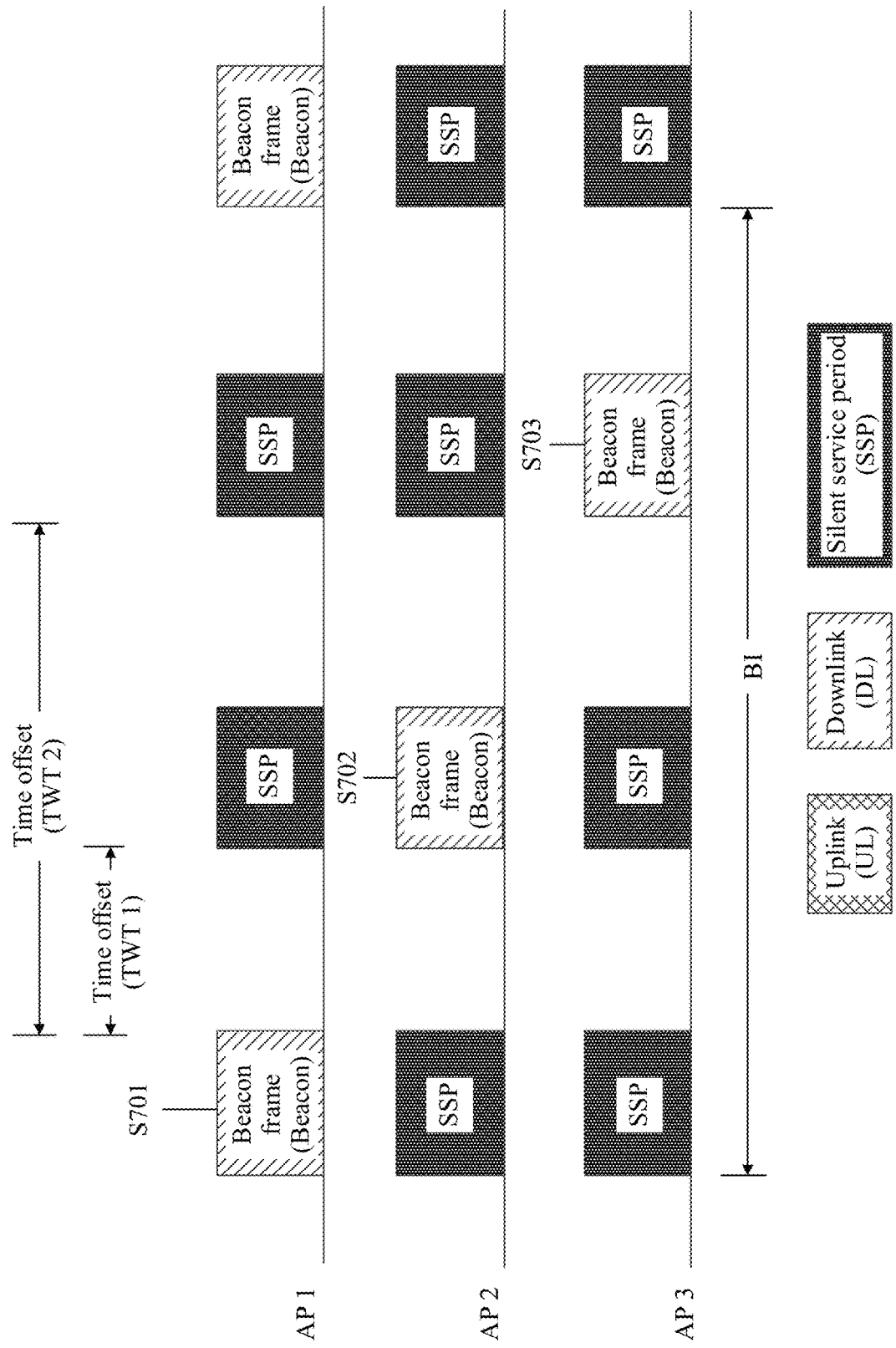
FIG. 7 is a third schematic flowchart of a beacon frame transmission control method according to this application.

FIG. 7 is a third schematic flowchart of a beacon frame transmission control method according to this application. As shown in FIG. 7, a step in which a master AP and a secondary AP use a TWT-based avoidance transmission manner may include the following steps.

S701: An AP 1 sends a first beacon frame.

In this application, the first beacon frame includes a silent TWT or a silent service period. The silent TWT or the silent service period includes a start time field and a service time field.

For example, the start time field may include time offsets TWT 1 and TWT 2. The TWT 1 is used to indicate a STA in a BSS of the AP 1 to stop data transmission in a transmission time period of a second beacon frame of an AP 2. Referring to FIG. 7, the TWT 1 may be a time offset between a time point at which the first beacon frame is received and a transmission time point of the second beacon frame of the AP 2. The TWT 2 is used to indicate the STA in the BSS of the AP 1 to stop data transmission in a transmission time period of a second beacon frame of an AP 3. Referring to FIG. 7, the TWT 2 may be a time offset between the time point at which the first beacon frame is received and a transmission time point of the second beacon frame of the AP 3. A value of the service time field may be a beacon transmission interval, namely, transmission duration of a beacon frame.

In this application, the STA in the BSS of the AP 1 waits for, after an end moment of the first beacon frame, the time offset TWT 1 before stopping data transmission, and is in a transmission stop state in transmission duration of a beacon frame of the AP 2. The STA in the BSS of the AP 1 waits for, after the end moment of the first beacon frame, the time offset TWT 2 before stopping data transmission, and is in the transmission stop state in transmission duration of a beacon frame of the AP 3.

S702: The AP 2 sends the second beacon frame of the AP 2 in the transmission time period of the second beacon frame of the AP 2, and keeps silent in a transmission time period of a beacon frame of another AP.

In this application, after receiving indication information that is sent by the AP 1 and that is used to indicate a transmission time period of a beacon frame of at least one secondary AP, the AP 2 may determine transmission time periods of beacon frames of a master AP and the AP 3 in an AP collaboration group based on the indication information, and include, in the second beacon frame of the AP 2, target wake time used to indicate to prohibit data transmission in the BSS of the AP 2 in the transmission time periods of the beacon frames of the master AP and the AP 3. Similar to the first beacon frame, the second beacon frame of the AP 2 may include a silent TWT or a silent service period. The silent TWT or the silent service period includes a start time field and a service time field.

For example, the start time field may include time offsets TWT 3 and TWT 4 (not shown in the figure). The TWT 3 may be a time offset between a time point at which the second beacon frame of the AP 2 is received and the transmission time point of the second beacon frame of the AP 3. In this case, the STA in the BSS of the AP 2 waits for, after an end moment of the second beacon frame of the AP 2, the TWT 3 before stopping data transmission, and is in the transmission stop state in the transmission duration of the beacon frame of the AP 3. The TWT 4 may be a time offset between the time point at which the second beacon frame of the AP 2 is received and a transmission time point of a first beacon frame of a closest AP 1. In this case, the STA in the BSS of the AP 2 waits for, after the end moment of the second beacon frame of the AP 2, the TWT 4 before stopping data transmission, and is in the transmission stop state in the transmission duration of the beacon frame of the AP 1.

S703: The AP 3 sends the second beacon frame of the AP 3 in the transmission time period of the second beacon frame of the AP 3, and keeps silent in a transmission time period of a beacon frame of another AP.

In this application, a manner in which the AP 3 sets the STA of the BSS to prohibit data transmission is similar to that of the AP 2. For details, refer to descriptions in S702.

It should be noted that, when the AP 1 sends the beacon frame, not both of the AP 2 and the AP 3 need to keep silent. In an implementation provided in this application, in the transmission time period of the first beacon frame, if any one of the at least one secondary AP in the AP collaboration group prohibits data transmission in a BSS of the secondary AP, it may be determined that interference to the first beacon frame can be reduced. Similarly, in a transmission time period of a second beacon frame of any target secondary AP, if at least one of another secondary AP than the target secondary AP in the AP collaboration group and the master AP prohibits data transmission in the BSS, it may also be determined that interference to the second beacon frame of the target secondary AP can be reduced.

In a second implementation of the silence period indication, prohibition of data transmission in the BSS may be set based on a quiet time period in 802.11ax. This implementation may also be referred to as an avoidance transmission manner based on a quiet time period. The quiet time period may also be referred to as a silence time period, and may be used to indicate a time period in which no data is transmitted.

Before a transmission time period of a beacon frame of any other AP in the AP collaboration group arrives, the master AP may send quiet time period indication information to a STA in a BSS corresponding to the master AP. The quiet time period indication information is used to indicate the STA in the BSS corresponding to the master AP to prohibit data transmission in a transmission time period of a beacon frame of another AP in the AP collaboration group than the master AP.

Similarly, before a transmission time period of a beacon frame of any other AP in the AP collaboration group arrives, the secondary AP may send quiet time period indication information to a STA in a BSS corresponding to the secondary AP. The quiet time period indication information is used to indicate the STA in the BSS corresponding to the secondary AP to prohibit data transmission in a transmission time period of a beacon frame of another AP in the AP collaboration group than the secondary AP. It should be noted that the other AP in the AP collaboration group than the secondary AP may be the master AP, or may be another secondary AP than the secondary AP.

Figure 8:
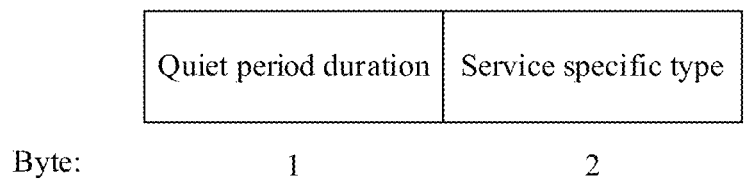
FIG. 8 is a schematic structural diagram of quiet time period indication information.

FIG. 8 is a schematic structural diagram of quiet time period indication information. As shown in FIG. 8, the quiet time period indication information may include a quiet period duration field and a service specific identifier field. A value of the service specific identifier field may be a beacon silent token, and the beacon silent token is used to indicate a reason why silence is required, that is, avoid a beacon frame of another AP in the AP collaboration group. The quiet period duration field is used to indicate duration in which a STA keeps silent after receiving the quiet time period indication information.

In an example, before a transmission time period of a second beacon frame of at least one secondary AP arrives, a master AP may send quiet time period indication information to a STA in a BSS corresponding to the master AP. A value of a quiet period duration field in the quiet time period indication information may be transmission duration of the second beacon frame of the at least one secondary AP. A value of a service specific identifier field in a quiet time period indication information may be a beacon silent token. The quiet time period indication information is used to indicate the STA in the BSS corresponding to the master AP to prohibit, after receiving the quiet time period indication information, data transmission in a time period indicated by the quiet period duration field.

In another example, before a transmission time period of a beacon frame of the other AP in the AP collaboration group arrives, any target secondary AP in the at least one secondary AP may send quiet time period indication information to a STA in a BSS corresponding to the target secondary AP. A value of a quiet period duration field in the quiet time period indication information is transmission duration of the beacon frame of the other AP. A value of a service specific identifier field is a beacon silent token. The quiet time period indication information is used to indicate the STA in the BSS corresponding to the target secondary AP to prohibit, after receiving the quiet time period indication information, data transmission in a time period indicated by the quiet period duration field.

Figure 9:
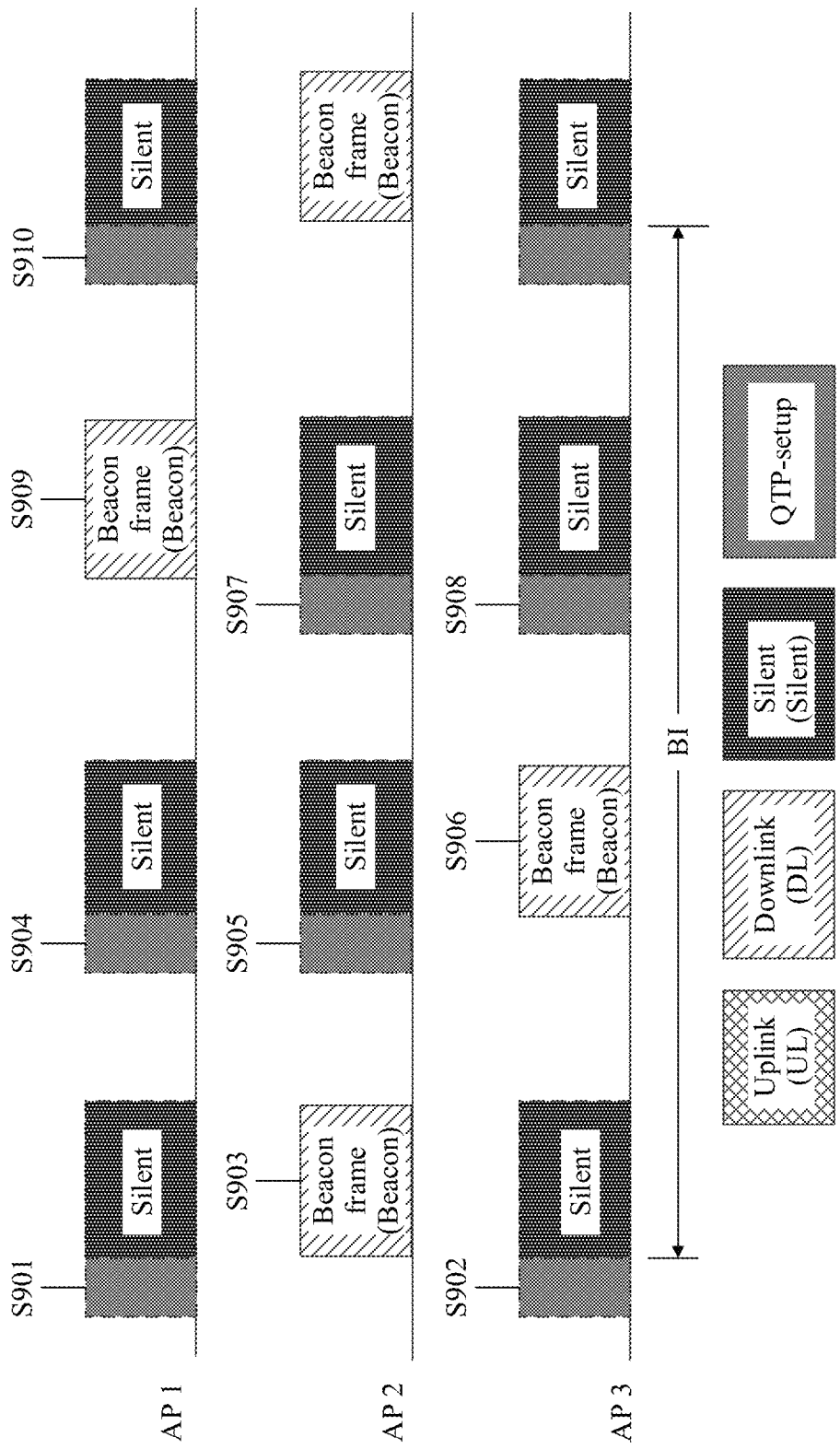
FIG. 9 is a fourth schematic flowchart of a beacon frame transmission control method according to this application.

FIG. 9 is a fourth schematic flowchart of a beacon frame transmission control method according to this application. FIG. 9 shows a process in which each AP in an AP collaboration group sets prohibition of data transmission in a BSS corresponding to the AP in a transmission time period of a beacon frame of another AP. For example, the AP in the AP collaboration group may send a quiet time period by using a quiet time period setup (QTP-Setup) message.

S901: An AP 1 may send a QTP-setup message to a STA in a BSS of the AP 1 before a transmission time period of a beacon frame of an AP 2 arrives. A value of a quiet period duration field is transmission duration of the beacon frame of the AP 2.

A quiet time period of the QTP-setup message sent by the AP 1 is used to indicate the STA in the BSS of the AP 1 to prohibit, after receiving the quiet time period, data transmission in quiet period duration.

S902: An AP 3 may send a QTP-setup message to a STA in a BSS of the AP 3 before the transmission time period of the beacon frame of the AP 2 arrives. A value of a quiet period duration field is the transmission duration of the beacon frame of the AP 2.

A quiet time period of the QTP-setup message sent by the AP 3 is used to indicate the STA in the BSS of the AP 3 to prohibit, after receiving the quiet time period, data transmission in quiet period duration.

S903: The AP 2 may send the beacon frame of the AP 2 before the transmission time period of the beacon frame of the AP 2 arrives.

In other words, before the AP 2 sends the beacon frame, the AP 1 and/or the AP 3 may send the QTP-setup message, to indicate a STA in a BSS in which the AP 1 and/or the AP 3 are/is located to prohibit, after receiving the quiet time period sent by the AP in the BSS, data transmission in the quiet period duration.

S904: The AP 1 may send a QTP-setup message to a STA in the BSS of the AP 1 before a transmission time period of a beacon frame of the AP 3 arrives. A value of a quiet period duration field is transmission duration of the beacon frame of the AP 3.

S905: The AP 2 may send a QTP-setup message to a STA in the BSS of the AP 2 before the transmission time period of the beacon frame of the AP 3 arrives. A value of a quiet period duration is the transmission duration of the beacon frame of the AP 3.

S906: The AP 3 may send the beacon frame of the AP 3 before the transmission time period of the beacon frame of the AP 3 arrives.

In other words, before the AP 3 sends a beacon, the AP 1 and/or the AP 2 may send the QTP-setup message, to indicate a STA in a BSS in which the AP 1 and/or the AP 2 are/is located to prohibit, after receiving the quiet time period sent by the AP in the BSS, data transmission in the quiet period duration.

S907: The AP 2 may send a QTP-setup message to a STA in the BSS of the AP 2 before the transmission time period of the beacon frame of the AP 1 arrives. A value of a quiet period duration field is transmission duration of the beacon frame of the AP 1.

S908: The AP 3 may send a QTP-setup message to a STA in the BSS of the AP 3 before the transmission time period of the beacon frame of the AP 1 arrives. A value of a quiet period duration field is the transmission duration of the beacon frame of the AP 1.

S909: The AP 1 may send the beacon frame of the AP 1 before the transmission time period of the beacon frame of the AP 1 arrives.

In other words, before the AP 1 sends a beacon, the AP 2 and/or the AP 3 may send the QTP-setup message, to indicate a STA in a BSS in which the AP 2 and/or the AP 3 are/is located to prohibit, after receiving the quiet time period sent by the AP in the BSS, data transmission in the quiet period duration. In an implementation provided in this application, to avoid interference between a first beacon frame sent by a master AP in the AP collaboration group and the beacon frame of the other AP in the AP collaboration group, the master AP may alternatively notify, at an early stage of determining the AP collaboration group, all secondary APs in the AP collaboration group that transmission of beacon frames of all the secondary APs is prohibited in a transmission time period of a beacon frame of the master AP. Because a beacon frame of each secondary AP is not sent in the transmission time period of the first beacon frame, a STA within a communication range of each secondary AP may not access a BSS of each secondary AP. In this way, no STA in the BSS of each secondary AP may initiate data transmission.

It should be noted that not both of the AP 1 and the AP 3 need to keep quiet when the AP 2 sends the beacon. In the implementation provided in this embodiment of this application, if a STA in a BSS corresponding to at least one of the AP 1 and the AP 3 keeps silent when the AP 2 sends the beacon, it can be determined that interference to the beacon frame of the AP 2 can be reduced. In other words, S901 and S902 are not steps that need to be performed simultaneously. Similarly, S904 and S905 are not steps that need to be performed simultaneously, and S907 and S908 are not steps that need to be performed simultaneously.

Optionally, the steps in this embodiment of this application may further include the following step.

S910: The AP 1 may send a QTP-setup message to a STA in the BSS of the AP 1 before a transmission time period of a next beacon frame of the AP 2 arrives. A value of a quiet period duration field is the transmission duration of the beacon frame of the AP 2.

In another implementation provided in this application, S901 and S910 performed by the AP 1 are not mandatory steps. For example, the quiet time period indication information carried in the QTP-setup message in S901 may alternatively include a quiet period field. For example, a value of the quiet period field may be a BI. In this case, the STA in the BSS corresponding to the AP 1 may keep, after receiving the QTP-setup message in S901, silent in an SSP after an end moment of the QTP-setup message in S901, and keep, after the end moment of the QTP-setup message in S901, silent in an SSP at intervals of a BI. Referring to FIG. 9, an SSP after each QTP-setup message may be a beacon transmission interval.

According to both of the foregoing two implementations, any AP in the AP collaboration group can prohibit data transmission in the BSS in the transmission time period of the beacon frame of the other AP in the AP collaboration group, thereby avoiding interference to the beacon frame of the other AP. For details and technical effects of other technical solutions in this embodiment of this application, refer to descriptions in other embodiments of this application.

Embodiment 4

Based on any one of the foregoing embodiments, before step S401, the master AP may be further determined in the following manner. The process of determining the master AP may also be referred to as a master AP selection procedure.

In a master AP selection procedure, a convening AP may send a convening request to a neighbor AP, to trigger the neighbor AP to feed back information, and then select, based on the received information, the master AP in the AP collaboration group from the at least two APs including the convening AP and the neighbor AP.

Figure 10:
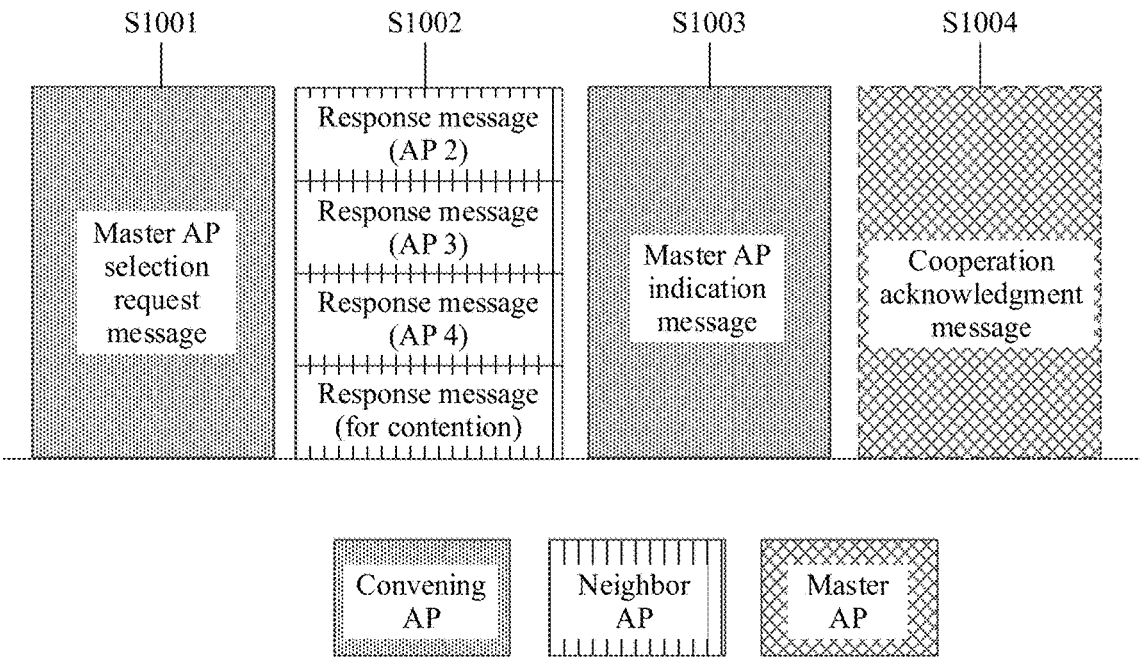
FIG. 10 is a schematic flowchart of a method for determining a master AP according to this application.

FIG. 10 is a schematic flowchart of a method for determining a master AP according to this application. As shown in FIG. 10, a horizontal axis is a time axis. A process of interaction between a convening AP and a neighbor AP may include the following steps.

S1001: The convening AP sends a master AP selection request message, to indicate the neighbor AP to feed back information used to determine a master AP.

In this application, the convening AP may send a convening request by using the master AP selection request message. For example, the convening AP may send the master AP selection request message in a broadcast manner.

In this application, there may be at least two APs in a preset area. The convening AP may be either of the at least two APs, and the neighbor AP may be at least one other AP in the at least two APs than the convening AP. Before sending the master AP selection request message, the convening AP may determine a neighbor AP in the preset area corresponding to the convening AP. The neighbor AP determined before the master AP selection request message is sent may be referred to as a neighbor AP known to the convening AP.

For example, in this application, the information that the convening AP indicates the neighbor AP to feed back may include a quantity of neighbor APs, and a beacon period.

S1002: The neighbor AP sends a response message. The response message is used to feed back the information used to determine the master AP.

In this application, there may be one or more neighbor APs that send response messages to the convening AP. Each neighbor AP may send a response message to the convening AP. The response message includes a quantity of neighbor APs of each AP, a beacon period, and the like.

In this application, a plurality of neighbor APs may send the response messages in an orthogonal frequency division multiple access (OFDMA) manner, to save time. For example, an OFDMA manner in which the neighbor AP sends the response message may include two manners: scheduling and contention.

It should be noted that, because the master AP selection request message may be sent in the broadcast manner, the neighbor AP that sends the response message to the convening AP may be a neighbor AP known to the convening AP, or may be a neighbor AP unknown to the convening AP. The neighbor AP unknown to the convening AP may be another AP than the neighbor AP known to the convening AP, for example, an AP newly powered on in the preset area, or an AP located at an edge of the preset area.

During actual application, the neighbor AP known to the convening AP may send a response message in a scheduling manner, and the neighbor AP unknown to the convening AP may send a response message in a contention manner.

Using FIG. 10 as an example, the convening AP may be an AP 1. Before sending the master AP selection request message, the convening AP may determine that an AP 2, an AP 3, and an AP 4 are located in the preset area, that is, determine that known neighbor APs include the AP 2, the AP 3, and the AP 4. Then, when sending the master AP selection request message, the convening AP may indicate, in the master AP selection request message, time-frequency resources scheduled for the AP 2, the AP 3, and the AP 4. In addition, the convening AP may further indicate, in the master AP selection request message, a time-frequency resource that is used for contention and that is allocated to the neighbor AP unknown to the convening AP. Then, the neighbor APs known to the convening AP may send the response messages by using the time-frequency resources scheduled by the convening AP. As shown in FIG. 10, the AP 2, the AP 3, and the AP 4 each send the response message by using the allocated time-frequency resource, and the neighbor AP unknown to the convening AP may send, by using the time-frequency resource used for contention, the response message in the contention manner.

S1003: The convening AP sends a master AP indication message.

In this application, after receiving information, such as a quantity of neighbor APs, fed back by at least one neighbor AP, the convening AP may select, from a plurality of APs including the convening AP and the at least one neighbor AP, an AP having a largest quantity of neighbor APs as the master AP based on the received quantity, fed back by the at least one neighbor AP, of neighbor APs and a quantity that is of neighbor APs and that corresponds to the convening AP. In an example, the master AP may be the convening AP, or may be any neighbor AP.

In this application, the convening AP may send the master AP indication message in the broadcast manner.

In this application, the master AP indication message may include an addr of the master AP. The addr of the master AP may be at least one of the following information: a MAC address of the master AP, a BSS ID of the master AP, a virtual AP ID corresponding to the master AP, an ID of the master AP in a PCP, an ID of the master AP in an AP cluster, or a BSS color of the master AP.

S1004: The master AP sends a cooperation acknowledgment message.

In this application, the master AP may send the cooperation acknowledgment message in the broadcast manner. When the convening AP and the master AP are not a same AP, the master AP may send the cooperation acknowledgment message to the convening AP. The cooperation acknowledgment message may indicate that the master AP has acknowledged an identity of the master AP in an AP collaboration group. After the identity of the master AP is acknowledged, an identity of an AP in the AP collaboration group other than the master AP may be a secondary AP. Then, the master AP may start to execute the step of generating the indication information used to indicate the transmission time period of the beacon frame of the at least one secondary AP in the AP collaboration group.

In another implementation provided in this application, it should be noted that step S1004 may not be a mandatory step in this embodiment of this application. For example, when the convening AP and the master AP are the same AP, the convening AP may not need to send a cooperation acknowledgment message by using an external message.

It should be noted that, in this implementation provided in this application, the convening AP and the finally determined master AP may not be the same AP.

In an example, if the convening AP and the finally determined master AP may not be the same AP, the convening AP may obtain a quantity that is of neighbor APs and that corresponds to each of the at least two APs, for example, may send the convening request; and then determine an AP that is in the at least two APs and that corresponds to a largest quantity of neighbor APs as the master AP in the AP collaboration group corresponding to the at least two APs. After selecting the master AP, the convening AP may send a master AP acknowledgment indication to the selected master AP and another neighbor AP, where the master AP acknowledgment indication includes the addr of the master AP. In addition, the convening AP may further determine a BI. Correspondingly, after receiving the convening request sent by the convening AP, the master AP may send, to the convening AP, the quantity that is of the neighbor APs and that corresponds to the master AP. Then, the master AP may receive the master AP indication message sent by the convening AP, where the master AP indication message is sent by the convening AP to the AP having the largest quantity of neighbor APs. Then, the master AP may send the cooperation acknowledgment message to the convening AP.

In another example, if the convening AP is the master AP in step S401, before generating the indication information used to indicate the transmission time period of the beacon frame of the at least one secondary AP, the master AP may perform the step in which the convening AP obtains the quantity of neighbor APs of each of the at least two APs, where the master AP is the AP having the largest quantity of neighbor APs in the at least two APs.

It should be further noted that some or all APs in the AP collaboration group may be APs in the at least two APs. In an example, the APs in the AP collaboration group may be all or partially the same as the APs in the at least two APs. In an implementation, the convening AP may alternatively not be an AP in the AP collaboration group.

This embodiment of this application provides an implementation of determining the master AP. For details and technical effects of other technical solutions in this embodiment of this application, refer to descriptions in other embodiments of this application.

Embodiment 5

An embodiment of this application further provides a method for determining an AP collaboration group. Based on any one of the foregoing embodiments, before step 101, the AP collaboration group may be further determined in the following manner.

In an implementation of determining the AP collaboration group, after a master AP is determined, the master AP may trigger a neighbor AP to send a response message indicating whether the neighbor AP is willing to join the AP collaboration group. The neighbor AP may send the response message indicating whether the neighbor AP is willing to join the AP collaboration group. Then, the master AP sends, to the neighbor AP, a collaboration group indication message indicating to set up the AP collaboration group.

Figure 11:
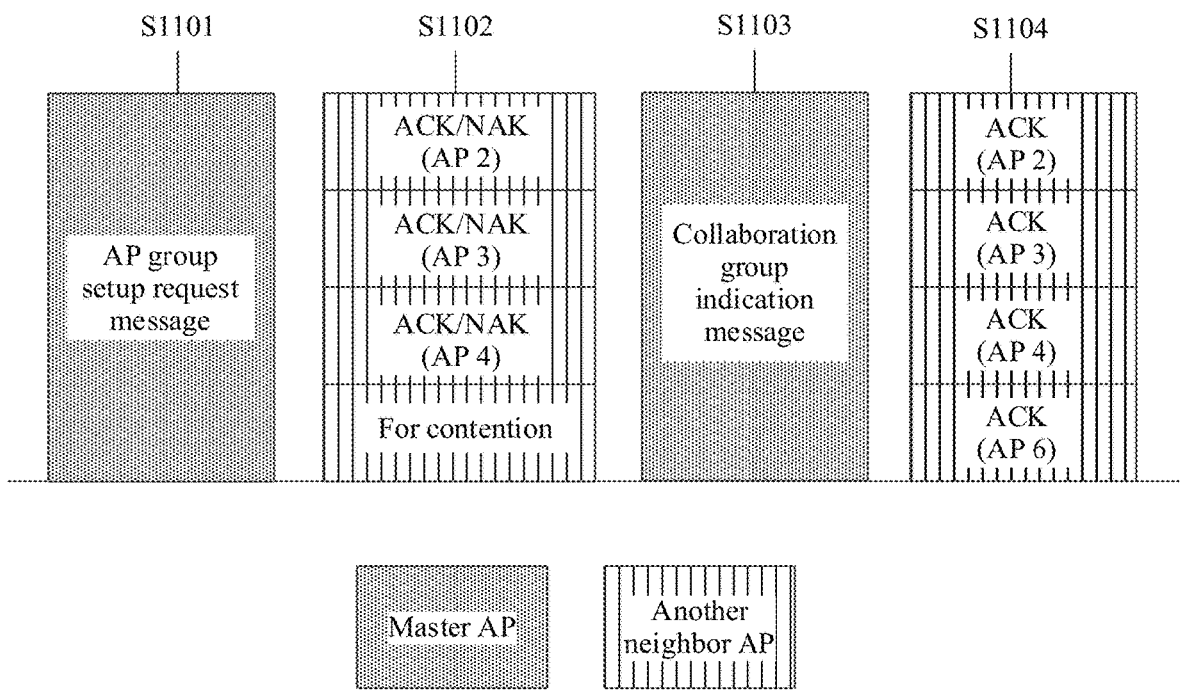
FIG. 11 is a schematic flowchart of a method for determining an AP collaboration group according to this application.

FIG. 11 is a schematic flowchart of a method for determining an AP collaboration group according to this application. As shown in FIG. 11, a horizontal axis is a time axis. A process of interaction between a master AP and a neighbor AP may include the following steps.

S1101: The master AP sends an AP group setup request message. The AP group setup request message is used to trigger the neighbor AP to send a response message indicating whether the neighbor AP is willing to join the AP collaboration group.

In this application, after an identity of the master AP is acknowledged, the master AP may indicate, in the AP group setup request message, the neighbor AP to send the response message in an OFDMA scheduling manner or an OFDMA contention manner.

S1102: The neighbor AP sends the response message to the master AP. The response message is used to indicate whether the neighbor AP agrees to join the AP collaboration group.

In this application, referring to FIG. 11, the neighbor AP may send "ACK" to indicate that the neighbor AP agrees to join the AP collaboration group, or may send "NAK" to indicate that the neighbor AP disagrees to join the AP collaboration group. Another AP may be an AP known to the master AP or an AP unknown to the master AP. The known AP may send a response message by using a time-frequency resource pre-scheduled by the master AP, and may send an ACK or a NAK in the scheduling manner. For example, the known APs include an AP 2, an AP 3, and an AP 4 shown in FIG. 11. The unknown AP may send a response message by using a time-frequency resource that is reserved by the master AP and that is used for contention. If the unknown AP may send an ACK in the contention manner, it indicates that the unknown AP agrees to join the AP collaboration group.

S1103: The master AP sends a collaboration group indication message. The collaboration group indication message is used to indicate to set up the AP collaboration group.

In this application, the master AP may send the collaboration group indication message in the broadcast manner. The collaboration group indication message may include a member of the AP collaboration group and related information of the AP collaboration group. The related information of the AP collaboration group may include an identifier (Group ID) of the AP collaboration group, an allocated AID, a BI, and the like.

S1104: A secondary AP in the AP collaboration group sends an acknowledgment message to the master AP.

In this application, the secondary AP may send the acknowledgment message (ACK) to the master AP to indicate that the collaboration group indication message is received. The step in which the secondary AP sends the acknowledgment message to the master AP is an optional step. For example, as shown in FIG. 11, the secondary APs may include an AP 2, an AP 3, an AP 4, and an AP 6. The secondary APs may send acknowledgment messages by using time-frequency resources scheduled by the master AP.

This embodiment of this application provides an implementation of determining the AP collaboration group in the beacon frame transmission control method. For details and technical effects of other technical solutions in this embodiment of this application, refer to descriptions in other embodiments of this application.

Embodiment 6

Figure 12:
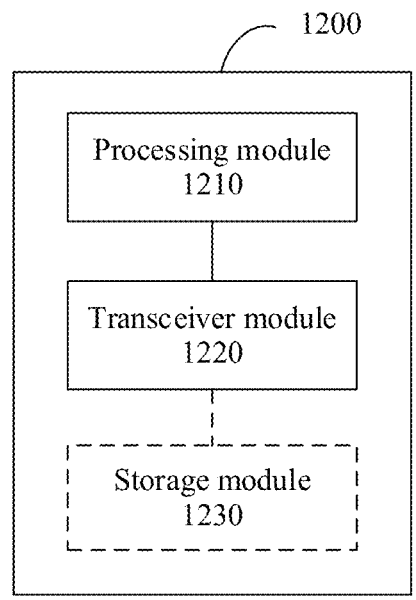
FIG. 12 is a schematic block diagram of an apparatus 1200 of a master AP according to an embodiment of this application.

FIG. 12 is a schematic block diagram of an apparatus 1200 on a side of a master AP according to an embodiment of this application. In an embodiment, the apparatus 1200 shown in FIG. 12 may correspond to the apparatus on the side of the master AP in the foregoing method embodiments, and may have any function of the master AP in the methods. Optionally, the apparatus 1200 in this embodiment of this application may be the master AP, or may be a chip in the master AP. The apparatus 1200 may include a processing module 1210 and a transceiver module 1220. Optionally, the apparatus 1200 may further include a storage module 1230.

For example, the processing module 1210 may be configured to perform step S401 in the foregoing method embodiment.

The transceiver module 1220 may be configured to: perform a step in step S402 or step S404 in the foregoing method embodiment, or perform a step in step S501 in the foregoing method embodiment, or perform a step in step S601 in the foregoing method embodiment, or perform a step in step S701 in the foregoing method embodiment, or perform a step in step S901, step S904, or step S909 in the foregoing method embodiment, or perform step S1001 or step S1002, or perform step S1101 or step S1102, or receive the master AP selection request message sent in step S1001, or receive the master AP indication message sent in S1003.

It should be understood that, the apparatus 1200 according to this embodiment of this application may correspond to the master AP in the methods of the foregoing embodiments, and the foregoing management operations and/or functions of the modules and other management operations and/or functions of the modules in the apparatus 1200 are intended to implement corresponding steps in the foregoing methods. For brevity, details are not described herein again.

Alternatively, the apparatus 1200 may be configured as a universal processing system, which, for example, is generally referred to as a chip. The processing module 1210 may include one or more processors that provide a processing function. For example, the transceiver module 1220 may be an input/output interface, a pin, or a circuit. The input/output interface may be configured to be responsible for information interaction between the chip system and the outside. For example, the input/output interface may process a response message, a master AP selection request message, a master AP indication message, an acknowledgment message, and the like that are input to the chip by another module located outside the chip. The processing module may execute a computer-executable instruction stored in the storage module, to implement a function of the master AP in the foregoing method embodiments. In an example, the storage module 1230 optionally included in the apparatus 1200 may be a storage unit in the chip, such as a register or a cache. Alternatively, the storage module 1230 may be a storage unit located outside the chip, such as a read-only memory (ROM), another type of static storage device that can store static information and an instruction, or a random access memory (RAM).

Figure 13:
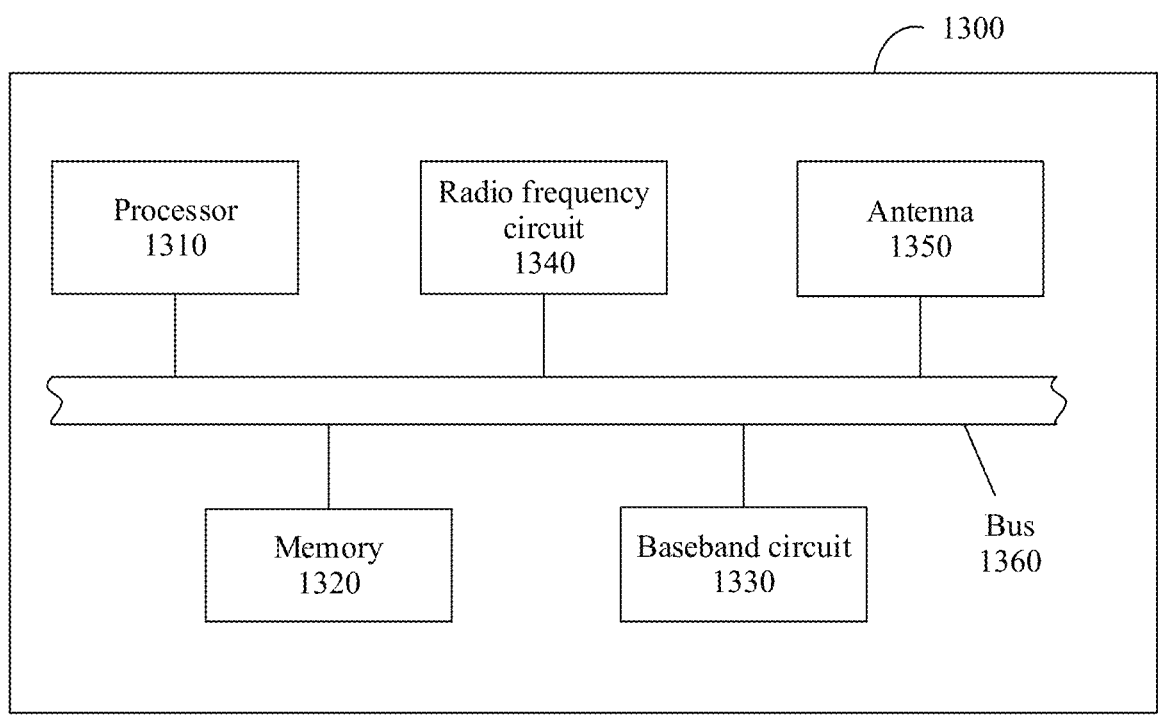
FIG. 13 is a schematic block diagram of another communications apparatus 1300 on a side of a master AP according to an embodiment of this application.

In another example, FIG. 13 is a schematic block diagram of another communications apparatus 1300 on a side of a master AP according to an embodiment of this application. The apparatus 1300 in this embodiment of this application may be the master AP in the foregoing method embodiments, and the apparatus 1300 may be configured to perform some or all functions of the master AP in the foregoing method embodiments. The apparatus 1300 may include a processor 1310, a baseband circuit 1313, a radio frequency circuit 1340, and an antenna 1350. Optionally, the apparatus 1300 may further include a memory 1320. All the components of the apparatus 1300 are coupled together by using a bus 1360. The bus 1360 includes a data bus, and further includes a power bus, a control bus, and a status signal bus. However, for a clear description, various buses are marked as the bus 1360 in the figure.

The processor 1310 may be configured to: control the master AP, and perform processing that is performed by the master AP in the foregoing embodiments. The processor 1310 may perform processing processes related to the master AP in the foregoing method embodiments and/or may be used for other processes of the technology described in this application, and may further run an operating system, manage the bus, and execute a program or an instruction stored in the memory.

The baseband circuit 1313, the radio frequency circuit 1340, and the antenna 1350 may be configured to support information receiving and sending between the master AP and the station in the foregoing embodiments, to support wireless communication between the master AP and another node. In an example, a measurement result sent by the station is received by using the antenna 1350, processed by the radio frequency circuit 1340 through processing such as filtering, amplification, down-conversion, and digitization, processed by the baseband circuit 1313 through baseband processing such as decoding and protocol-based data decapsulation, and processed by the processor 1310, to restore service data and signaling information that are sent by the station. In still another example, a station group setup feedback message sent by the master AP may be processed by the processor 1310, processed by the baseband circuit 1313 through baseband processing such as protocol-based encapsulation and encoding, further processed by the radio frequency circuit 1340 through radio frequency processing such as analog conversion, filtering, amplification, and up-conversion, and sent to the master AP by using the antenna 1350.

The memory 1320 may be configured to store program code and data of the master AP, and the memory 1320 may be the storage module 1230 in FIG. 12. It can be understood that the baseband circuit 1313, the radio frequency circuit 1340, and the antenna 1350 may be further configured to support communication between the master AP and another network entity, for example, communication between the master AP and a network element on a core network side. In FIG. 13, the memory 1320 is shown as separated from the processor 1310. However, it is readily figured out by a person skilled in the art that the memory 1320 or any portion thereof may be located outside the apparatus 1300. For example, the memory 1320 may include a transmission cable and/or a computer product separated from a wireless node. These media may be accessed by the processor 1310 by using the bus 1360. Alternatively, the memory 1320 or any portion thereof may be integrated into the processor 1310, for example, may be a cache and/or a general purpose register.

It may be understood that, FIG. 13 merely shows a simplified design of the master AP. For example, during actual application, the master AP may include any quantity of transmitters, receivers, processors, memories, and the like, and all master APs that can implement the disclosure fall within the protection scope thereof.

Figure 14:
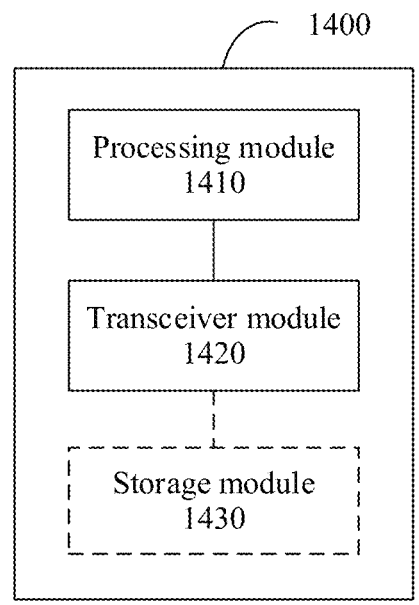
FIG. 14 is a schematic block diagram of an apparatus 1400 of a secondary AP according to an embodiment of this application.

FIG. 14 is a schematic block diagram of an apparatus 1400 on a side of a secondary AP according to an embodiment of this application. In an embodiment, the apparatus 1400 shown in FIG. 14 may correspond to the apparatus on the side of the secondary AP in the foregoing method embodiments, and may have any function of the secondary AP in the methods. Optionally, the apparatus 1400 in this embodiment of this application may be the secondary AP, or may be a chip in the secondary AP. The apparatus 1400 may include a processing module 1410 and a transceiver module 1420. Optionally, the apparatus 1400 may further include a storage module 1430.

For example, the processing module 1410 may be configured to perform step S405 in the foregoing method embodiment.

The transceiver module 1420 may be configured to: receive the signaling or data sent in step S402 in the foregoing method embodiment, or perform step S403 and step S405; or may be configured to: receive the signaling or data sent in step S501 in the foregoing method embodiment, or perform step S502 or step S503; or may be configured to: receive the signaling or data sent in step S601 in the foregoing method embodiment, or perform step S602 or step S603; or may be configured to: receive the signaling or data sent in step S701 in the foregoing method embodiment, or perform step S702 or step S703; or may be configured to perform step S903, step S905, or step S907; or may be configured to perform step S902, step S906, or step S908; or may be configured to: receive the signaling or data sent in step S1001 or step S1003 in the foregoing method embodiment, or perform step S1002 or step S1004; or may be configured to: receive the signaling or data sent in step S1101 or step S1103 in the foregoing method embodiment, or perform step S1102 or step S1104.

It should be understood that, the apparatus 1400 according to this embodiment of this application may correspond to the secondary AP in the methods of the foregoing embodiments, and the foregoing management operations and/or functions of the modules and other management operations and/or functions of the modules in the apparatus 1400 are intended to implement corresponding steps in the foregoing methods. For brevity, details are not described herein again.

Alternatively, the apparatus 1400 may be configured as a universal processing system, which, for example, is generally referred to as a chip. The processing module 1410 may include one or more processors that provide a processing function. For example, the transceiver module 1420 may be an input/output interface, a pin, or a circuit. The input/output interface may be configured to be responsible for information interaction between the chip system and the outside. For example, the input/output interface may process a response message, a master AP selection request message, a cooperation acknowledgment message, an AP group setup request message, a collaboration group indication message, and a master AP indication message that are input to the chip by another module located outside the chip. The processing module may execute a computer-executable instruction stored in the storage module, to implement a function of the secondary AP in the foregoing method embodiments. In an example, the storage module 1430 optionally included in the apparatus 1400 may be a storage unit in the chip, such as a register or a cache. Alternatively, the storage module 1430 may be a storage unit located outside the chip, such as a read-only memory (ROM), another type of static storage device that can store static information and an instruction, or a random access memory (RAM).

Figure 15:
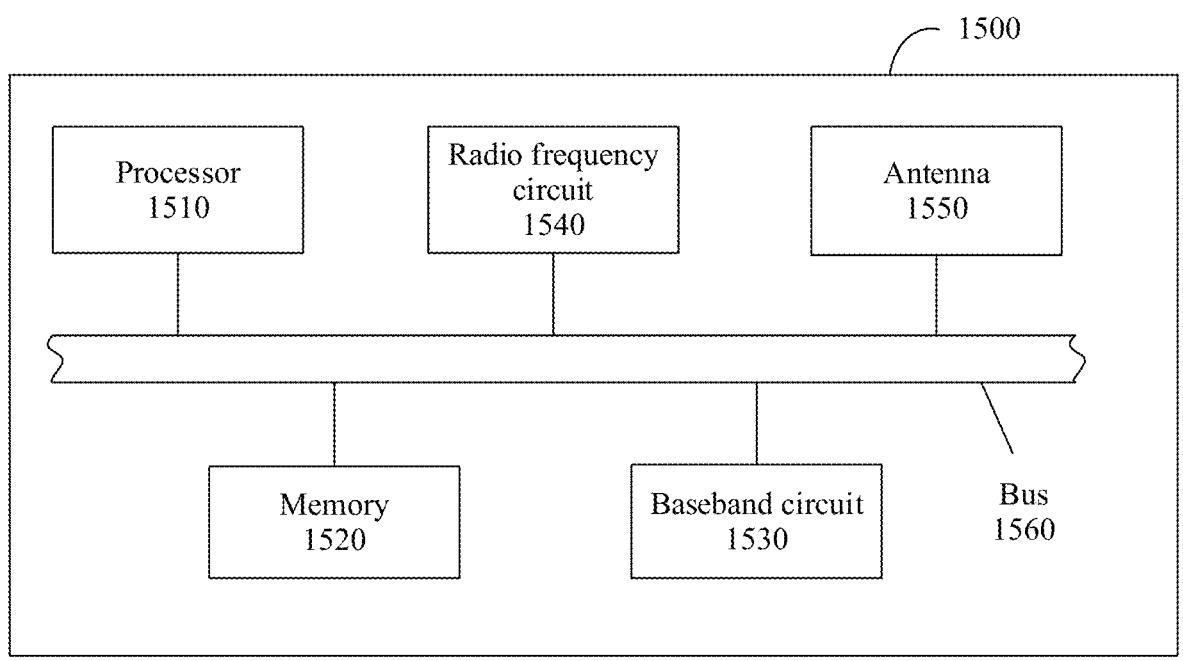
FIG. 15 is a schematic block diagram of another communications apparatus 1500 on a side of a secondary AP according to an embodiment of this application.

In another example, FIG. 15 is a schematic block diagram of another communications apparatus 1500 on a side of a secondary AP according to an embodiment of this application. The apparatus 1500 in this embodiment of this application may be the secondary AP in the foregoing method embodiments, and the apparatus 1500 may be configured to perform some or all functions of the secondary AP in the foregoing method embodiments. The apparatus 1500 may include a processor 1510, a baseband circuit 1515, a radio frequency circuit 1540, and an antenna 1550. Optionally, the apparatus 1500 may further include a memory 1520. All the components of the apparatus 1500 are coupled together by using a bus 1560. The bus 1560 includes a data bus, and further includes a power bus, a control bus, and a status signal bus. However, for a clear description, various buses are marked as the bus 1560 in the figure.

The processor 1510 may be configured to: control the secondary AP, and perform processing that is performed by the secondary AP in the foregoing embodiments. The processor 1510 may perform processing processes related to the secondary AP in the foregoing method embodiments and/or may be used for other processes of the technology described in this application, and may further run an operating system, manage the bus, and execute a program or an instruction stored in the memory.

The baseband circuit 1515, the radio frequency circuit 1540, and the antenna 1550 may be configured to support information receiving and sending between the secondary AP and the station in the foregoing embodiments, to support wireless communication between the secondary AP and another node. In an example, a measurement result sent by the station is received by using the antenna 1550, processed by the radio frequency circuit 1540 through processing such as filtering, amplification, down-conversion, and digitization, processed by the baseband circuit 1515 through baseband processing such as decoding and protocol-based data decapsulation, and processed by the processor 1510, to restore service data and signaling information that are sent by the station. In still another example, a station group setup feedback message sent by the secondary AP may be processed by the processor 1510, processed by the baseband circuit 1515 through baseband processing such as protocol-based encapsulation and encoding, further processed by the radio frequency circuit 1540 through radio frequency processing such as analog conversion, filtering, amplification, and up-conversion, and sent to the secondary AP by using the antenna 1550.

The memory 1520 may be configured to store program code and data of the secondary AP, and the memory 1520 may be the storage module 1430 in FIG. 14. It can be understood that the baseband circuit 1515, the radio frequency circuit 1540, and the antenna 1550 may be further configured to support communication between the secondary AP and another network entity, for example, communication between the secondary AP and a network element on a core network side. In FIG. 15, the memory 1520 is shown as separated from the processor 1510. However, it is readily figured out by a person skilled in the art that the memory 1520 or any portion thereof may be located outside the apparatus 1500. For example, the memory 1520 may include a transmission cable and/or a computer product separated from a wireless node. These media may be accessed by the processor 1510 by using the bus 1560. Alternatively, the memory 1520 or any portion thereof may be integrated into the processor 1510, for example, may be a cache and/or a general purpose register.

It may be understood that, FIG. 15 merely shows a simplified design of the secondary AP. For example, during actual application, the secondary AP may include any quantity of transmitters, receivers, processors, memories, and the like, and all secondary APs that can implement the disclosure fall within the protection scope thereof.

Figure 16:
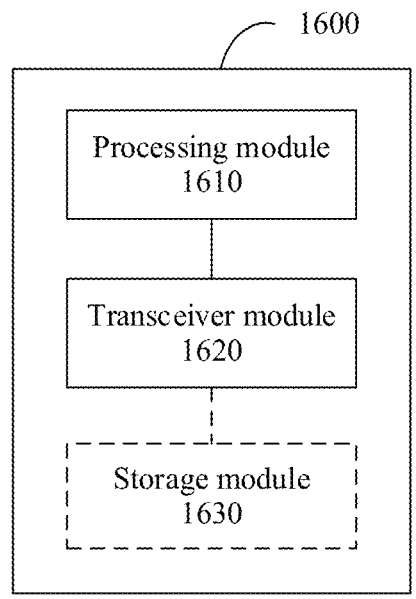
FIG. 16 is a schematic block diagram of an apparatus 1600 of a convening AP according to an embodiment of this application.

FIG. 16 is a schematic block diagram of an apparatus 1600 on a side of a convening AP according to an embodiment of this application. In an embodiment, the apparatus 1600 shown in FIG. 16 may correspond to the apparatus on the side of the convening AP in the foregoing method embodiments, and may have any function of the convening AP in the methods. Optionally, the apparatus 1600 in this embodiment of this application may be the convening AP, or may be a chip in the convening AP. The apparatus 1600 may include a processing module 1610 and a transceiver module 1620. Optionally, the apparatus 1600 may further include a storage module 1630. It should be noted that the convening AP may be either of at least two APs or any AP in an AP collaboration group. For example, the convening AP may be the master AP or the first AP in the foregoing methods.

For example, the processing module 1610 may be configured to perform step S1001 in the foregoing method embodiment.

The transceiver module 1620 may be configured to perform step S1001 or step S1003; or may be configured to receive the signaling or data sent in the S1002 or S1004 in the foregoing method embodiment. It should be noted that, if the convening AP is the master AP in the foregoing method embodiments, the transceiver module 1620 may be further configured to perform the steps performed by the transceiver module 1320; or if the convening AP is the secondary AP in the foregoing method embodiments, the transceiver module 1620 may be further configured to perform the steps performed by the transceiver module 1520.

It should be understood that, the apparatus 1600 according to this embodiment of this application may correspond to the convening AP in the methods of the foregoing embodiments, and the foregoing management operations and/or functions of the modules and other management operations and/or functions of the modules in the apparatus 1600 are intended to implement corresponding steps in the foregoing methods. For brevity, details are not described herein again.

Alternatively, the apparatus 1600 may be configured as a universal processing system, which, for example, is generally referred to as a chip. The processing module 1610 may include one or more processors that provide a processing function. For example, the transceiver module 1620 may be an input/output interface, a pin, or a circuit. The input/output interface may be configured to be responsible for information interaction between the chip system and the outside. For example, the input/output interface may process a response message and a cooperation acknowledgment message that are input to the chip by another module located outside the chip. The processing module may execute a computer-executable instruction stored in the storage module, to implement a function of the convening AP in the foregoing method embodiments. In an example, the storage module 1630 optionally included in the apparatus 1600 may be a storage unit in the chip, such as a register or a cache. Alternatively, the storage module 1630 may be a storage unit located outside the chip, such as a read-only memory (ROM), another type of static storage device that can store static information and an instruction, or a random access memory (RAM).

Figure 17:
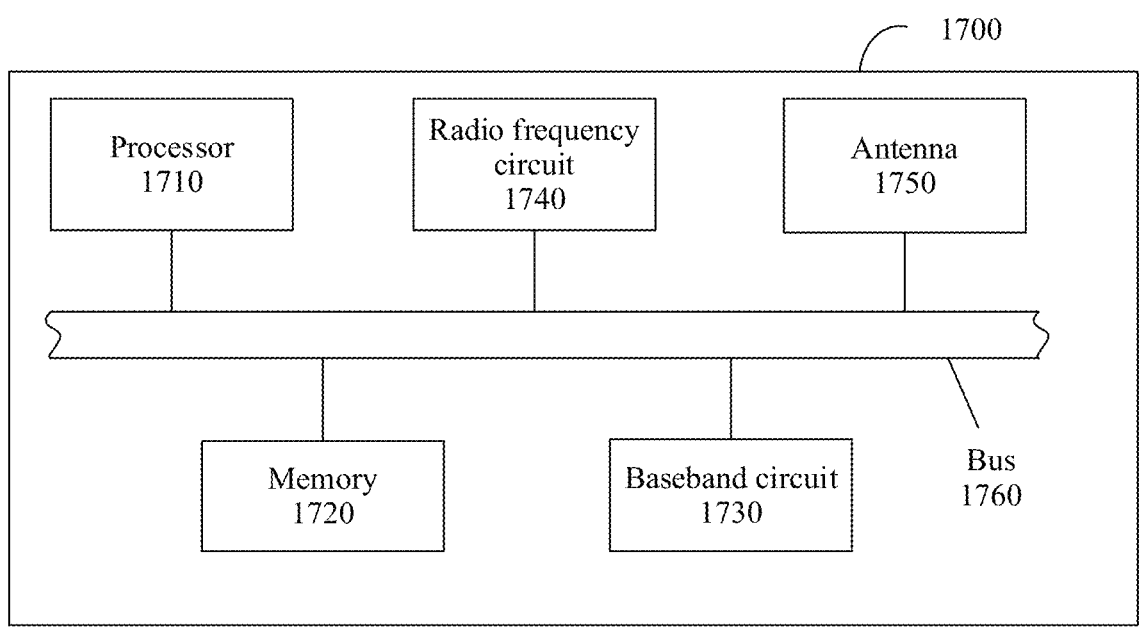
FIG. 17 is a schematic block diagram of another communications apparatus 1700 on a side of a convening AP according to an embodiment of this application.

In another example, FIG. 17 is a schematic block diagram of another communications apparatus 1700 on a side of a convening AP according to an embodiment of this application. The apparatus 1700 in this embodiment of this application may be the convening AP in the foregoing method embodiments, and the apparatus 1700 may be configured to perform some or all functions of the convening AP in the foregoing method embodiments. The apparatus 1700 may include a processor 1710, a baseband circuit 1717, a radio frequency circuit 1740, and an antenna 1750. Optionally, the apparatus 1700 may further include a memory 1720. All the components of the apparatus 1700 are coupled together by using a bus 1760. The bus 1760 includes a data bus, and further includes a power bus, a control bus, and a status signal bus. However, for a clear description, various buses are marked as the bus 1760 in the figure.

The processor 1710 may be configured to: control the convening AP, and perform processing that is performed by the convening AP in the foregoing embodiments. The processor 1710 may perform processing processes related to the convening AP in the foregoing method embodiments and/or may be used for other processes of the technology described in this application, and may further run an operating system, manage the bus, and execute a program or an instruction stored in the memory.

The baseband circuit 1717, the radio frequency circuit 1740, and the antenna 1750 may be configured to support information receiving and sending between the convening AP and the station in the foregoing embodiments, to support wireless communication between the convening AP and another node. In an example, a measurement result sent by the station is received by using the antenna 1750, processed by the radio frequency circuit 1740 through processing such as filtering, amplification, down-conversion, and digitization, processed by the baseband circuit 1717 through baseband processing such as decoding and protocol-based data decapsulation, and processed by the processor 1710, to restore service data and signaling information that are sent by the station. In still another example, a station group setup feedback message sent by the convening AP may be processed by the processor 1710, processed by the baseband circuit 1717 through baseband processing such as protocol-based encapsulation and encoding, further processed by the radio frequency circuit 1740 through radio frequency processing such as analog conversion, filtering, amplification, and up-conversion, and sent to the convening AP by using the antenna 1750.

The memory 1720 may be configured to store program code and data of the convening AP, and the memory 1720 may be the storage module 1630 in FIG. 16. It can be understood that the baseband circuit 1717, the radio frequency circuit 1740, and the antenna 1750 may be further configured to support communication between the convening AP and another network entity, for example, communication between the convening AP and a network element on a core network side. In FIG. 17, the memory 1720 is shown as separated from the processor 1710. However, it is readily figured out by a person skilled in the art that the memory 1720 or any portion thereof may be located outside the apparatus 1700. For example, the memory 1720 may include a transmission cable and/or a computer product separated from a wireless node. These media may be accessed by the processor 1710 by using the bus 1760. Alternatively, the memory 1720 or any portion thereof may be integrated into the processor 1710, for example, may be a cache and/or a general purpose register.

It may be understood that, FIG. 17 merely shows a simplified design of the convening AP. For example, during actual application, the convening AP may include any quantity of transmitters, receivers, processors, memories, and the like, and all convening APs that can implement the disclosure fall within the protection scope thereof.

An embodiment of this application further provides a computer-readable storage medium. The computer-readable storage medium stores an instruction, and the instruction may be executed by one or more processors in a processing circuit. When the instruction is run on a computer, the computer is enabled to perform the methods in the foregoing aspects.

An embodiment of this application further provides a chip system. The chip system includes a processor, configured to support a distributed unit, a centralized unit, and a master AP, a secondary AP, or a convening AP in implementing a function in the foregoing embodiments, for example, generating or processing data and/or information in the foregoing methods.

In a possible design, the chip system may further include a memory. The memory is configured to store program instructions and data for the distributed unit, the centralized unit, and the master AP, the secondary AP, or the convening AP. The chip system may include a chip, or may include a chip and another discrete component.

An embodiment of this application further provides a processor, configured to be coupled to a memory. The processor is configured to perform the method and the function of the master AP in any one of the foregoing embodiments.

An embodiment of this application further provides a processor, configured to be coupled to a memory. The processor is configured to perform the method and the function of the secondary AP in any one of the foregoing embodiments.

An embodiment of this application further provides a processor, configured to be coupled to a memory. The processor is configured to perform the method and the function of the convening AP in any one of the foregoing embodiments.

An embodiment of this application further provides a computer program product including an instruction. When the computer program product runs on a computer, the computer is enabled to perform the method and the function of the master AP in any one of the foregoing embodiments.

An embodiment of this application further provides a computer program product including an instruction. When the computer program product runs on a computer, the computer is enabled to perform the method and the function of the secondary AP in any one of the foregoing embodiments.

An embodiment of this application further provides a computer program product including an instruction. When the computer program product runs on a computer, the computer is enabled to perform the method and the function of the convening AP in any one of the foregoing embodiments.

An embodiment of this application further provides a wireless communications system. The system includes the master AP and the at least one secondary AP in the foregoing embodiments.

An embodiment of this application further provides a wireless communications system. The system includes the convening AP and the at least one other AP in the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a special-purpose computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk)), or the like.

What is claimed is:

1. A beacon frame transmission control method for an access point (AP) collaboration group including a plurality of APs, the method comprising:
   generating, by a master AP of the AP collaboration group, indication information used to indicate a transmission time period of a second beacon frame of a secondary AP of the AP collaboration group; and
   sending, by the master AP, the indication information to the secondary AP by sending, by the master AP, a first beacon frame within a beacon interval (BI) of the master AP, wherein the first beacon frame comprises the indication information, wherein
   the transmission time periods of beacon frames of the plurality of APs in the AP collaboration group are different, wherein
   the indication information comprises a time interval and identification information that is used to indicate the secondary AP, the identification information further comprises a location identifier of the secondary AP in the AP collaboration group, and wherein
   the time interval is in a one-to-one correspondence with the secondary AP, and the time interval is used to indicate a time difference between a transmission time point of the second beacon frame of the secondary AP and an end time point of the first beacon frame.

2. The method according to claim 1, wherein the beacon interval (BI) comprises N equal time periods, wherein N−1 is equal to a quantity of secondary APs in the AP collaboration group; a transmission time period of the first beacon frame corresponds to a first time period in the N time periods; and (N−1) equal time periods in the N time periods other than the first time period are in a one-to-one correspondence with the plurality of APs of the AP collaboration group.

3. The method according to claim 2, wherein the indication information comprises a list, the list comprises the plurality of APs of the AP collaboration group, the list further comprises an identifier used to indicate each AP of the AP collaboration group, and a location of each identifier in the list is in a one-to-one correspondence with the (N−1) equal time periods; and the transmission time period of the second beacon frame of the secondary AP is an equal time period corresponding to the location of the identifier of the secondary AP in the list.

4. A beacon frame transmission control method, comprising:
   receiving, by a target secondary access point (AP) of an AP collaboration group comprising a plurality of APs, indication information that is sent by a master AP of the same AP collaboration group, and that is used to indicate a transmission time period of a second beacon frame of another secondary AP of the same AP collaboration group by receiving, by the target secondary AP, the first beacon frame sent by the master AP, wherein the first beacon frame comprises the indication information, and the indication information is used to indicate a transmission time period of the second beacon frame; and
   sending, by the target secondary AP, a beacon frame of the target secondary AP in the transmission time period, indicated by the indication information, of the beacon frame, wherein
   the transmission time periods of beacon frames of the plurality of APs in the AP collaboration group are different, wherein
   the indication information comprises a time interval and identification information that is used to indicate the secondary AP, the identification information further comprises a location identifier of the secondary AP in the AP collaboration group, and wherein
   the time interval is in a one-to-one correspondence with the secondary AP, and the time interval is used to indicate a time difference between a transmission time point of the second beacon frame of the secondary AP and an end time point of the first beacon frame.

5. The method according to claim 4, wherein a beacon interval (BI) comprises N equal time periods, wherein N−1 is equal to a quantity of secondary APs in the AP collaboration group; a transmission time period of the first beacon frame corresponds to a first time period in the N time periods; and (N−1) equal time periods in the N time periods other than the first time period are in a one-to-one correspondence with the plurality of APs of the AP collaboration group.

6. The method according to claim 5, wherein the indication information comprises a list, the list comprises the plurality of APs of the AP collaboration group, the list further comprises an identifier used to indicate each AP of the AP collaboration group, and a location of each identifier in the list is in a one-to-one correspondence with the (N−1) equal time periods; and the transmission time period of the second beacon frame of the secondary AP is an equal time period corresponding to the location of the identifier of the secondary AP in the list.

7. A beacon frame transmission control apparatus, located on a side of a master access point (AP), the master AP being one AP of a plurality of APs of an AP collaboration group, wherein the apparatus comprises:
 a processor, configured to generate indication information used to indicate a transmission time period of a second beacon frame of a secondary AP of the AP collaboration group, and further configured to send a first beacon frame within a beacon interval (BI) of the master AP, wherein the first beacon frame comprises the indication information, and the indication information is used to indicate a transmission time period of the second beacon frame, wherein
 the indication information comprises a time interval and identification information that is used to indicate the secondary AP, the identification information further comprises a location identifier of the secondary AP in the AP collaboration group, and wherein
 the time interval is in a one-to-one correspondence with the secondary AP, and the time interval is used to indicate a time difference between a transmission time point of the second beacon frame of the secondary AP and an end time point of the first beacon frame; and
 a transceiver, configured to send the indication information to the secondary AP, and the transmission time periods of beacon frames of the plurality of APs in the AP collaboration group are different.

8. The apparatus according to claim 7, wherein the beacon interval (BI) comprises N equal time periods, wherein N−1 is equal to a quantity of secondary APs in the AP collaboration group; a transmission time period of the first beacon frame corresponds to a first time period in the N time periods; and (N−1) equal time periods in the N time periods other than the first time period are in a one-to-one correspondence with the plurality of APs of the AP collaboration group.

9. The apparatus according to claim 8, wherein the indication information comprises a list, the list comprises the plurality of APs of the AP collaboration group, the list further comprises an identifier used to indicate each AP of the AP collaboration group, and a location of each identifier in the list is in a one-to-one correspondence with the (N−1) equal time periods; and the transmission time period of the second beacon frame of the secondary AP is an equal time period corresponding to the location of the identifier of the secondary AP in the list.

* * * * *

UNITED STATES PATENT AND TRADEMARK OFFICE
CERTIFICATE OF CORRECTION

PATENT NO. : 11,974,297 B2
APPLICATION NO. : 17/155386
DATED : April 30, 2024
INVENTOR(S) : Mao Yang et al.

It is certified that error appears in the above-identified patent and that said Letters Patent is hereby corrected as shown below:

In the Claims

In Column 38, Line 37, in Claim 4, after "information" delete "that is".

Signed and Sealed this
Twenty-fifth Day of June, 2024

Katherine Kelly Vidal
*Director of the United States Patent and Trademark Office*